US012761072B2

(12) United States Patent
Lin et al.

(10) Patent No.: US 12,761,072 B2
(45) Date of Patent: Oct. 13, 2026

(54) PHOTOELECTRIC SENSOR

(71) Applicant: LITE-ON TECHNOLOGY CORPORATION, Taipei City (TW)

(72) Inventors: Chen-Hsiu Lin, New Taipei City (TW); Bo-Jhih Chen, New Taipei City (TW)

(73) Assignee: LITE-ON TECHNOLOGY CORPORATION, Taipei City (TW)

( * ) Notice: Subject to any disclaimer, the term of this patent is extended or adjusted under 35 U.S.C. 154(b) by 86 days.

(21) Appl. No.: 19/019,483

(22) Filed: Jan. 14, 2025

(65) Prior Publication Data

US 2025/0155281 A1 May 15, 2025

Related U.S. Application Data

(63) Continuation-in-part of application No. 18/601,969, filed on Mar. 11, 2024, now Pat. No. 12,607,769.

(60) Provisional application No. 63/678,544, filed on Aug. 2, 2024, provisional application No. 63/459,378, filed on Apr. 14, 2023.

(30) Foreign Application Priority Data

Nov. 3, 2023 (CN) ........................ 202311452174.7
Dec. 13, 2024 (CN) ........................ 202423089471.2

(51) Int. Cl.
*G01J 1/02* (2006.01)
*G01J 1/04* (2006.01)

(52) U.S. Cl.
CPC .......... *G01J 1/0271* (2013.01); *G01J 1/0407* (2013.01)

(58) Field of Classification Search
CPC .............................. G01J 1/0271; G01J 1/0407
See application file for complete search history.

(56) References Cited

U.S. PATENT DOCUMENTS

2009/0128794 A1* 5/2009 Matsuyama ......... H03K 17/941
355/67
2010/0032592 A1* 2/2010 Kinoshita ................ G01V 8/12
156/60

* cited by examiner

*Primary Examiner* — Monica T Taba
(74) *Attorney, Agent, or Firm* — Li & Cai Intellectual Property Office

(57) ABSTRACT

A photoelectric sensor includes a housing, a light-emitting module, a light-receiving module, and two adhesive members. The housing including a first upright portion, a second upright portion, and a base portion. The first upright portion has a first concave structure and a first opening. The first concave structure includes a first side wall and a first outer wall. The second upright portion has a second concave structure and a second opening. The second concave structure includes a second side wall and a second outer wall. The light-emitting module is embedded in the first concave structure. The light-emitting module and the light-receiving module are embedded in the second concave structure through the two adhesive members, respectively. The light-emitting module includes a light-emitting element, and the light-receiving module includes a light-receiving element. The light-emitting element corresponds to the first opening, and the light-receiving element corresponds to the second opening.

14 Claims, 21 Drawing Sheets

PHOTOELECTRIC SENSOR

CROSS-REFERENCE TO RELATED PATENT APPLICATION

This application claims the benefit of priorities to China Patent Application No. 202311452174.7, filed on Nov. 3, 2023, and No. 202423089471.2, filed on Dec. 13, 2024, in the People's Republic of China. The entire content of the above identified application is incorporated herein by reference.

This application claims the benefit of priorities to the U.S. Provisional Patent Application Ser. No. 63/459,378, filed on Apr. 14, 2023, Ser. No. 63/678,544, filed on Aug. 2, 2024, which application is incorporated herein by reference in its entirety.

This application is a continuation-in-part application of the U.S. patent application Ser. No. 18/601,969, filed on Mar. 11, 2024, and entitled "PHOTOELECTRIC SENSOR," now pending, the entire disclosures of which are incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a photoelectric sensor, and more particularly to a through-beam photoelectric sensor.

BACKGROUND OF THE DISCLOSURE

Existing photoelectric sensors, such as through-beam photoelectric sensors, have a structure that includes a plastic U-shaped housing, a light-emitting element, and a light-receiving element. The light-emitting element and the light-receiving element are respectively adhered to outermost surfaces of two lateral sides of the plastic housing. The existing photoelectric sensors are usually manufactured in multiple units or as a single unit. Comparing the manufacturing process, producing photoelectric sensors as a single unit can shorten manufacturing time and reduce costs compared to manufacturing them in multiple units. However, during the injection molding process of the U-shaped housing of the photoelectric sensor manufactured as a single unit, the U-shaped housing tilts inward due to uneven shrinkage of the plastic material. When an inclination angle of the U-shaped housing is too large, it not only affects the appearance but also reduces the bonding strength between the circuit board and the housing.

Therefore, how to overcome the above-mentioned problem through an improvement in structural design has become an important issue to be addressed in the related art.

SUMMARY OF THE DISCLOSURE

In response to the above-referenced technical inadequacies, the present disclosure provides a through-beam photoelectric sensor to address the issue of the housing of the existing photoelectric sensor tilting inward due to uneven shrinkage of the plastic material during the injection molding process.

In order to solve the above-mentioned problems, one of the technical aspects adopted by the present disclosure is to provide a photoelectric sensor. The photoelectric sensor includes a housing, a light-emitting module, a light-receiving module, and two adhesive members. The housing includes a first upright portion, a second upright portion, and a base portion. The base portion is connected to the first upright portion and the second upright portion. The first upright portion has a first concave structure and a first opening. The first concave structure includes a first side wall and a first outer wall that surrounds the first side wall. The second upright portion has a second concave structure and a second opening. The second concave structure includes a second side wall and a second outer wall that surrounds the second side wall. The light-emitting module includes a first circuit board and a light-emitting element. The light-emitting module is embedded in the first concave structure, and the light-emitting element corresponds to the first opening. The light-receiving module includes a second circuit board and a light-receiving element. The light-receiving module is embedded in the second concave structure, and the light-receiving element corresponds to the second opening. The two adhesive members are respectively provided on side walls of the first concave structure and the second concave structure, so as to respectively bond the light-emitting module into the first concave structure and the light-receiving module into the second concave structure. A top of the first outer wall and a top of the second outer wall are separated by a first distance, a bottom of the first outer wall and a bottom of the second outer wall are separated by a second distance, and the difference between the second distance and the first distance is less than 28% of the second distance.

Therefore, in the photoelectric sensor provided by the present disclosure, by reducing the difference between the first distance (existing between the tops of the two outer walls) and the second distance (existing between the bottoms of the two outer walls), the difference between the second distance and the first distance is less than 28% of the second distance, so as to address the issue of the housing tilting inward due to uneven shrinkage of the plastic material during the injection molding process.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
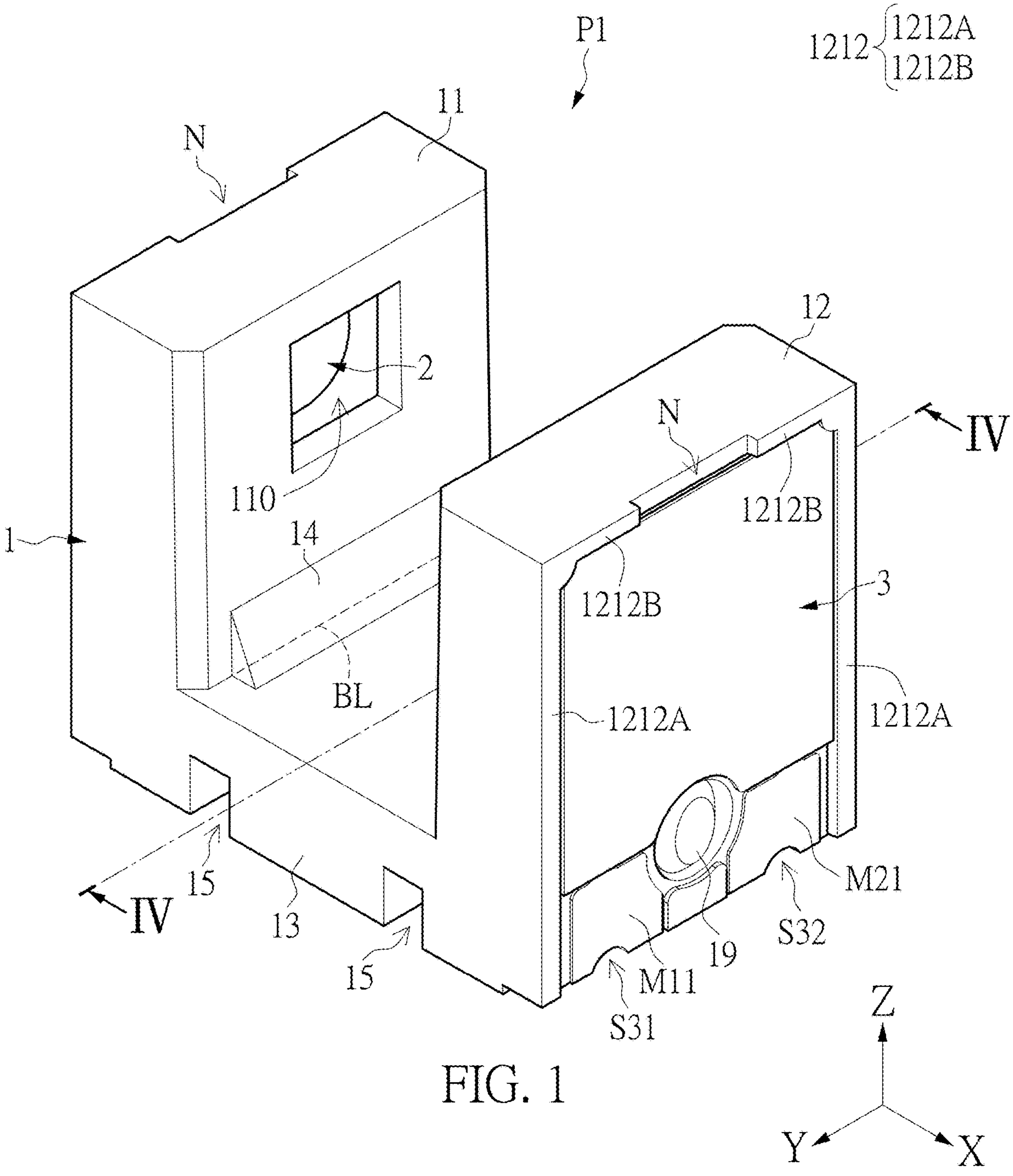
FIG. 1 is a schematic view of a photoelectric sensor according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
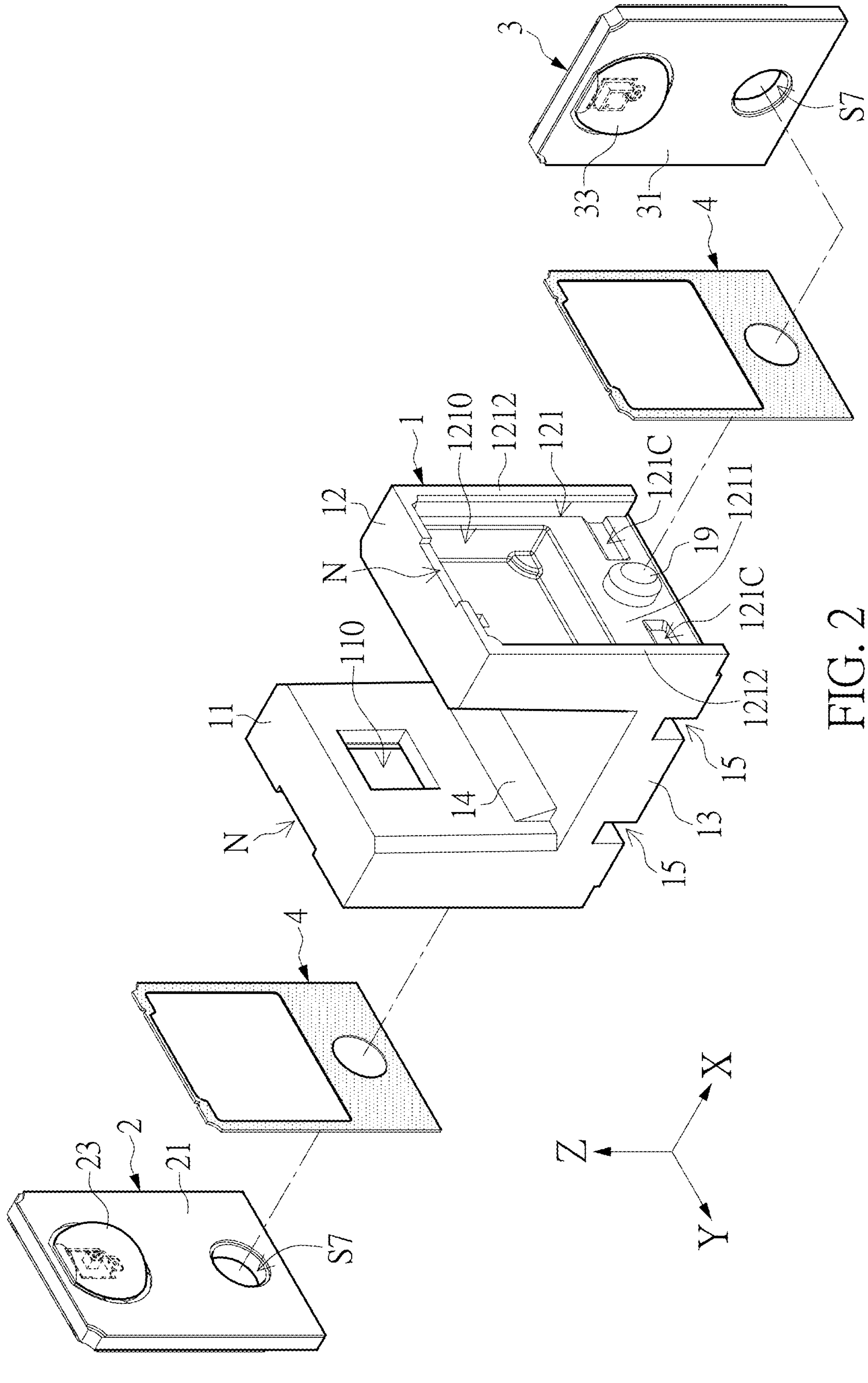
FIG. 2 a schematic exploded view of the photoelectric sensor according to the first embodiment of the present disclosure.
Figure 3:
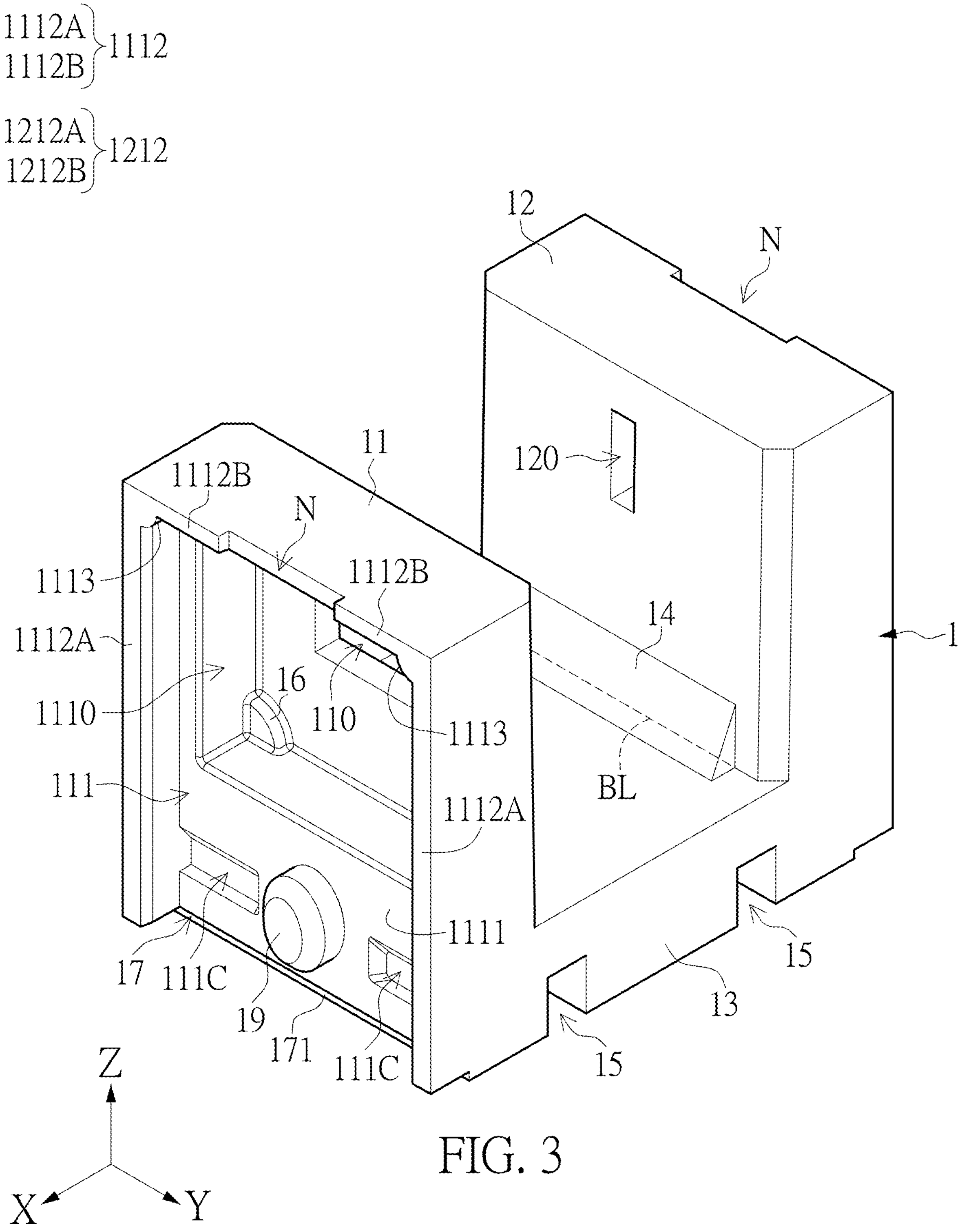
FIG. 3 is a schematic perspective view of the photoelectric sensor according to the first embodiment of the present disclosure.

Reference is made to FIG. 1 to FIG. 3. A first embodiment of the present disclosure provides a photoelectric sensor P1. The photoelectric sensor P1 includes a housing 1, a light-emitting module 2, a light-receiving module 3, and two adhesive members 4. The housing 1 includes a first upright portion 11, a second upright portion 12, and a base portion 13. The base portion 13 is connected to the first upright portion 11 and the second upright portion 12, such that the housing 1 is U-shaped. The first upright portion 11 has a first concave structure 11C and a first opening 110, and the second upright portion 12 has a second concave structure 12C and a second opening 120. In this embodiment, a size of the first opening 110 is greater than a size of the second opening 120. Except for the different sizes of the first opening 110 and the second opening 120, the internal structure of the first upright portion 11 is substantially the same as the structure of the second upright portion 12. The light-emitting module 2 and the light-receiving module 3 are respectively disposed on the first concave structure 111 and the second concave structure 121.

It is worth mentioning that housing 1 of the present disclosure is assembled with the light-emitting module 2 and the light-receiving module 3 in the form of a single piece. Preferably, the housing 1 can be formed by injection molding, but the method of manufacturing the housing 1 is not limited in the present disclosure. The housing 1 can be made by any method commonly used in the industry.

The first concave structure 111 includes a first side wall 1111 and a first outer wall 1112, and the first outer wall 1112 surrounds the first side wall 1111. The second concave structure 121 includes a second side wall 1211 and a second outer wall 1212, and the second outer wall 1212 surrounds the second side wall 1211. The two adhesive members 4 are respectively provided on the first side wall 1111 and the second side wall 1211, so as to respectively bond the light-emitting module 2 into the first concave structure 111 and the light-receiving module 3 into the second concave structure 121.

Specifically, One of the two adhesive members 4 is adhered between the first side wall 1111 of the first concave structure 111 and a first circuit board 21 of the light-emitting module 2, and another one of the two adhesive members 4 is adhered between the second side wall 1211 of the second concave structure 121 and a second circuit board 31 of the light-receiving module 3. The existing photoelectric sensor, manufactured in multiple units, is made of a continuous housing and a continuous circuit board. The continuous housing includes multiple housings that are connected to each other, while the continuous circuit board includes multiple circuit boards that are also connected to each other. The continuous circuit board is adhered to an outermost surface of a side wall of the continuous housing and is then cut, which limits the adhesive area between each individual housing and each individual circuit board. In contrast, the housing provided by the present disclosure has concave structures that allow circuit boards to be embedded within them, so that the adhesive area between the housing and the circuit board can be increased, and the adhesion strength can be improved.

The first side wall 1111 of the first concave structure 111 has two first slots 111C, the second side wall 1211 of the second concave structure 121 has two second slots 121C. Since the two adhesive members 4 are respectively adhered between the first side wall 1111 and the first circuit board 21, and between the second side wall 1211 and the second circuit board 31, the amount of the two adhesive members 4 is difficult to accurately control during the assembly process. Therefore, the first slots 111C and the second slots 121C are designed to accommodate the excess amount of the adhesive members 4 to prevent overflow.

In addition, the present disclosure provides several mechanisms to improve the inward tilt. For example, as shown in FIG. 2 and FIG. 3, the housing 1 includes two reinforcing ribs 14. One of the two reinforcing ribs 14 is connected to an intersection of the first upright portion 11 and the base portion 13, another one of the two reinforcing ribs 14 is connected to an intersection of the second upright portion 12 and the base portion 13. The reinforcing ribs 14 are mainly used to generate a reaction force that resists the inward shrinkage of the top of the U-shaped structure of the housing 1, so as to improve the inward shrinkage and deformation of the housing 1 made of the plastic material during the injection molding process.

Figure 4:
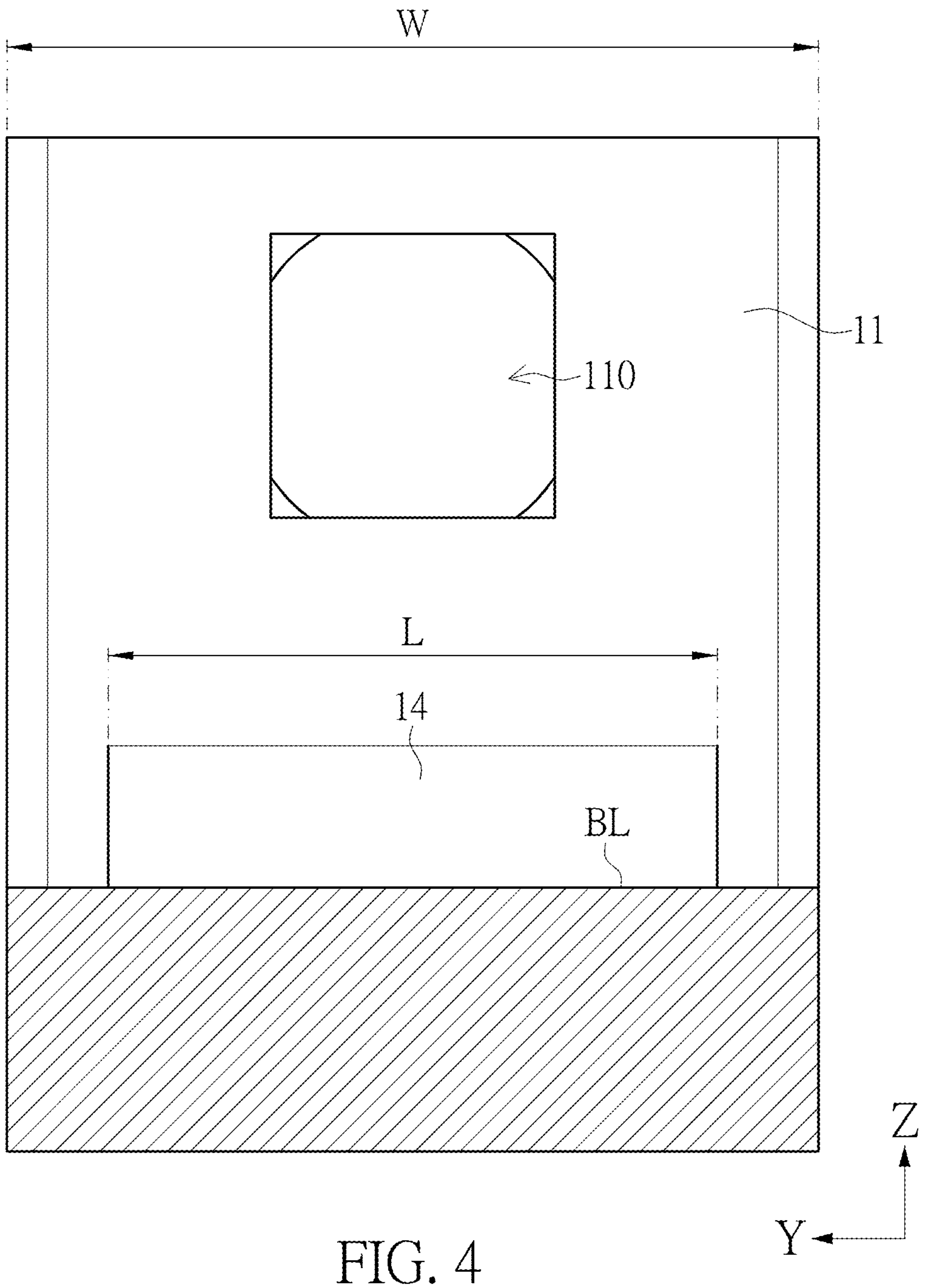
FIG. 4 is a schematic cross-sectional view taken along line IV-IV of FIG. 1.

Reference is made to FIGS. 1, 3, and 4. There is a boundary line BL between the first upright portion 11 and the base portion 13, and there is another boundary line BL between the second upright portion 12 and the base portion 13. The first upright portion 11 is taken as an example. The first upright portion 11 has a width W along an extension direction of the boundary line BL, the reinforcing rib 14 that is connected to the intersection of the first upright portion 11 and the base portion 13 has a length L along the extension direction of the boundary line BL. Preferably, the length L of one of the reinforcing ribs 14 is at least ⅔ of the width W of the first upright portion 11. Similarly, the length L of another one of the reinforcing ribs 14 is at least ⅔ of the width W of the second upright portion 12.

Figure 6:
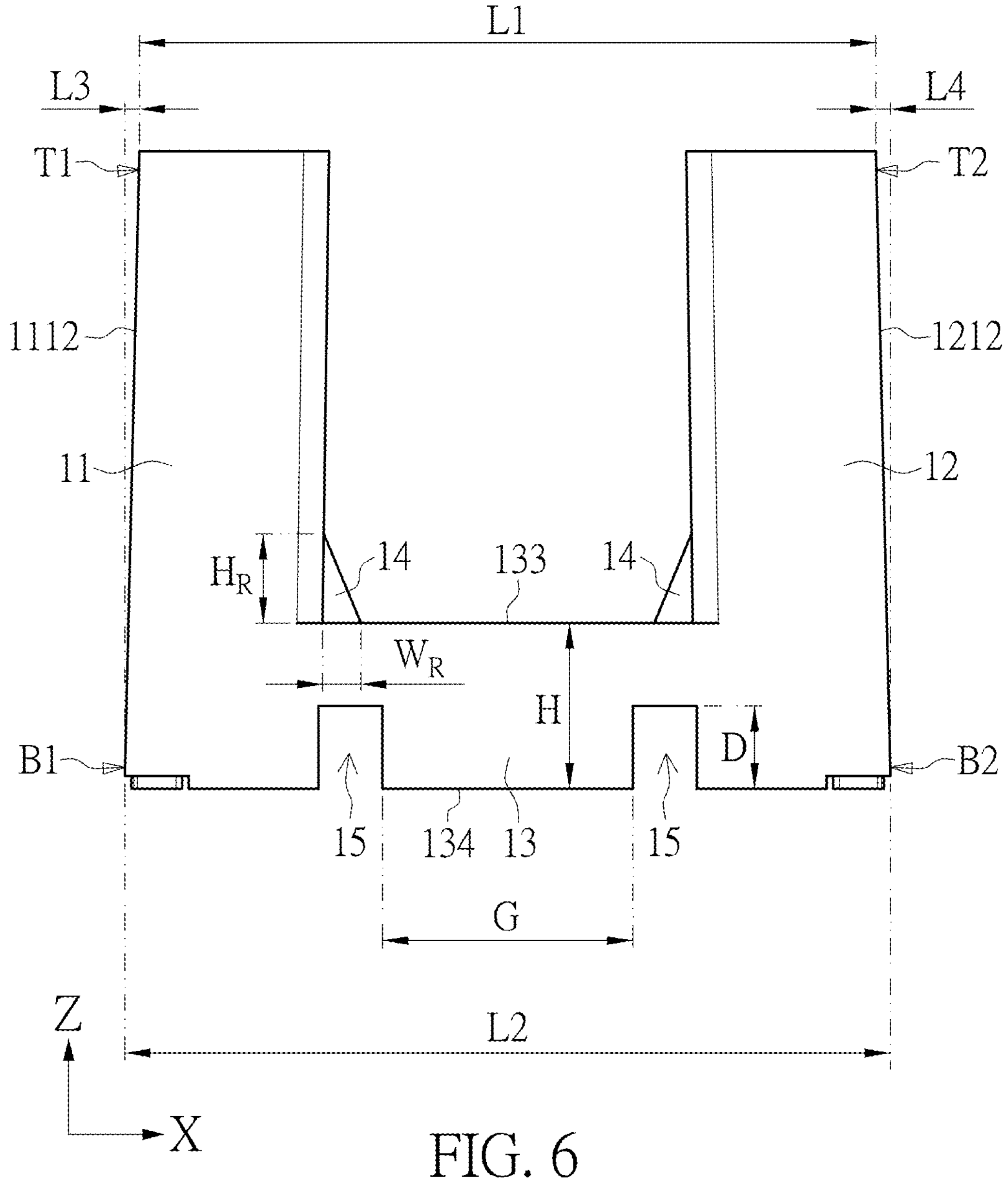
FIG. 6 is a schematic side view of the photoelectric sensor according to the first embodiment of the present disclosure.

A surface of each of the reinforcing ribs 14 can be, for example, a flat surface, an outer convex curved surface or an inner concave curved surface. The shape of the surface of each of the reinforcing ribs 14 is not limited in the present disclosure. In the embodiments of the present disclosure, the surface of each of the reinforcing ribs 14 is a flat surface. As shown in FIGS. 1 and 6, the first upright portion 11 and the second upright portion 12 are arranged along a direction (i.e., an X-axis direction). From a perspective that is perpendicular to this direction (i.e., along a Y-axis direction), an outline shape of a side surface of the reinforcing rib 14 can be, for example, a triangle. The triangle has a height HR (the intersection between the triangle and the first upright portion 11) and a base (i.e., the intersection between the triangle and the base portion 13) with a width WR. A ratio of the width WR to the height HR ranges from ⅓ to ½, preferably ½.

Figure 5:
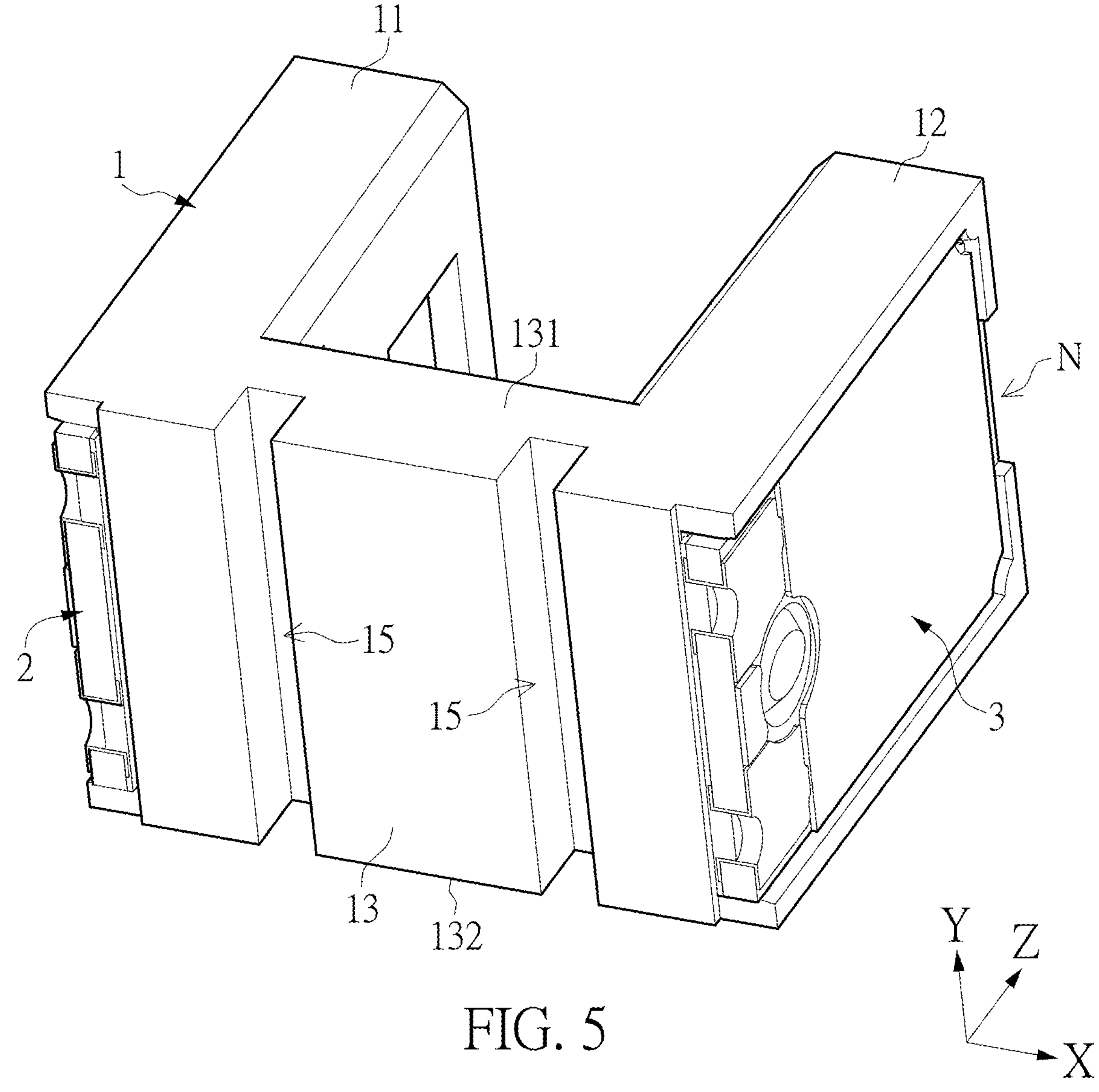
FIG. 5 is another schematic perspective view of the photoelectric sensor according to the first embodiment of the present disclosure.

Reference is made to FIG. 5. For example, the housing 1 further includes at least one groove 15 that is formed on a bottom of the base portion 13. An extending direction (i.e., the Y-axis direction) of the at least one groove 15 is perpendicular to the arrangement direction (i.e., the X-axis direction) of the first upright portion 11 and the second upright portion 12. The base portion 13 has two side surfaces 131, 132 that are opposite to each other. The at least one groove 15 penetrates the two side surfaces 131, 132. For example, a quantity of the groove 15 is two. As shown in FIG. 5 and FIG. 6, the two grooves 15 correspond to the two reinforcing ribs 14, respectively. However, the quantity of the groove 15 is not limited in the present disclosure. For example, in other embodiments, the quantity of the groove 15 can be one, which is located in a center position of the base portion 13.

As shown in FIG. 6, the base portion 13 has a height H, Specifically, the height H is a distance from an upper surface 133 of the base portion 13 to a lower surface 134 of the base portion 13. The base portion 13 has a depth D. For example, the depth D can be 0.3 to 0.6 times the height H, with 0.5 being preferable. For example, a gap G between the two grooves 15 is 1.2 to 1.7 times the height H, with 1.5 being preferable. Through the design of the grooves 15, the plastic material used to manufacture the housing 1 can shrink evenly, thereby improving the inward tilting of the housing 1.

Specifically, the housing 1 is made of the plastic material through the injection molding process. The plastic material is injected into a mold in a molten state at high temperatures and then cooled and solidified to form the shape of the housing 1. During the injection molding process, residual stress, also known as internal stress, exists within housing 1. When the internal stress is too high, the housing 1 cracks and warps, which can affect its mechanical properties and appearance. Therefore, through the design of the two grooves 15 in the base portion 13 of the housing 1, the internal stress within housing 1 can be significantly reduced. The grooves 15 allow for an even shrinkage of the plastic material during the injection molding process, helping to uniformly distribute and reduce the internal stress of the housing 1, thereby avoiding excessive concentration of the internal stress that could lead to cracking and warping. Furthermore, in the present disclosure, the inward shrinkage deformation of the housing 1 can be improved during the injection molding phase by generating a reaction force through the reinforcing ribs 14 that resists the inward bending and contraction of the U-shaped structure of housing 1.

Reference is made to FIGS. 1, 3, and 6. The first outer wall 1112 includes two long portions 1112A and two short portions 1112B, and the two short portions 1112B are disposed on an edge of a top of the housing 1. Similarly, the second outer wall 1212 includes two long portions 1212A and two short portions 1212B, and the two short portions 1212B are disposed on an edge of a top of the housing 1. Furthermore, as shown in FIG. 6, a top T1 (i.e., a position corresponding to the short portions 1112B in FIG. 3) of the first outer wall 1112 and a top T2 (i.e., a position corresponding to the short portions 1212B in FIG. 1) of the second outer wall 1212 are separated by a first distance L1. A bottom B1 (i.e., a position corresponding to the long portions 1112A in FIG. 3) of the first outer wall 1112 and a bottom B2 (i.e., a position corresponding to the long portions 1212A in FIG. 1) of the second outer wall 1212 are separated by a second distance L2. Through the structural design of the grooves 15 and the reinforcing ribs 14, a difference (L2−L1) between the first distance L1 and the second distance L2 can be reduced.

In order to clearly illustrate the condition of the housing 1 before and after improvement, reference is made to Table 1 below and review it in conjunction with FIG. 6. Table 1 presents the actual measurement results of the overall deformation of the housing 1 before and after improvement, specifically the difference (L2−L1) between the first distance L1 and the second distance L2.

TABLE 1

| Before improvement (the housing without the grooves and the reinforcing ribs) | After improvement (the housing with the reinforcing ribs) | After improvement (the housing with the grooves and the reinforcing ribs) |
|---|---|---|
| L2 − L1 (μm) | L2 − L1 (μm) | L2 − L1 (μm) |
| 219.37 | 160.8 | 82.5 |
| (L2 − L1)/L2 × 100% = 37% | (L2 − L1)/L2 × 100% = 27% | (L2 − L1)/L2 × 100% = 14% |

The overall deformation amount of the housing 1 is a ratio of the difference (L2−L1) to the second distance L2. For example, the second distance L2 is 600 μm. As shown in Table 1, before improvement (i.e., the housing has no reinforcing ribs and no groove), the ratio ranges from 28% to 40%, with 37% shown in Table 1. When the housing 1 includes the reinforcing ribs 14 but no grooves, the ratio can be reduced to 25% to 28% due to the design of the reinforcing ribs 14. Furthermore, when the housing 1 includes the reinforcing ribs 14 and the grooves 15, the ratio can be further reduced to 11% to 15% due to the designs of the reinforcing ribs 14 and the grooves 15. Therefore, the measurement results indicate that arranging structures such as the grooves 15 and the reinforcing ribs 14 on the housing 1 can effectively improve the concave deformation of the housing 1.

As shown in FIGS. 1, 3, and 6, for example, a notch N is provided between the two short portions 1112B, and another notch N is provided between the two short portions 1212B. During the assembly process of the photoelectric sensor P1, the position of the circuit board within the concave structure needs to be adjusted through a jig. The notch N can facilitate the insertion of the jig. In other words, the notch N allows the first circuit board 21 and the second circuit board 31 to be easily assembled into the first concave structure 111 and the second concave structure 121.

Figure 7:
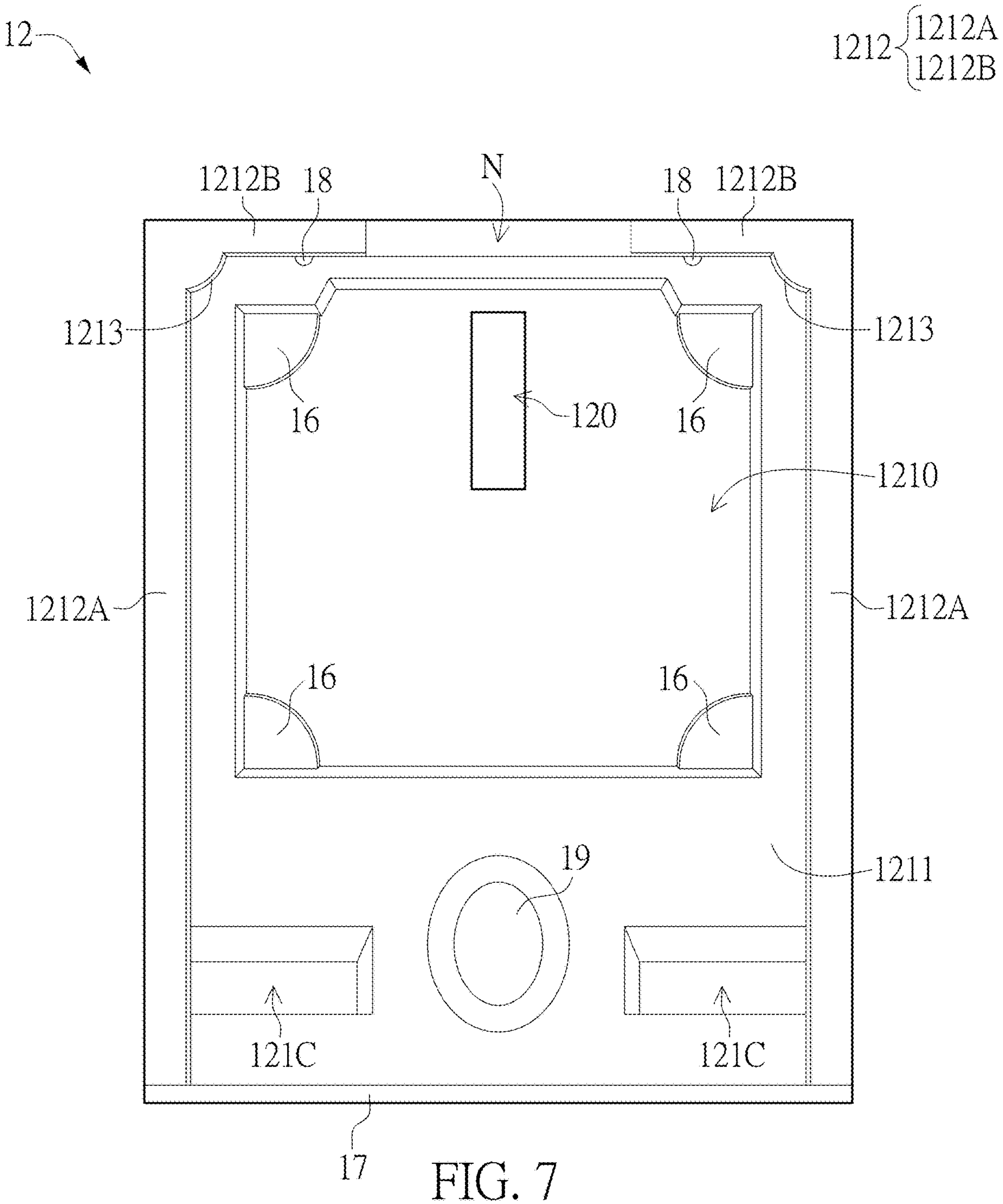
FIG. 7 is a schematic side view of a housing according to the first embodiment of the present disclosure.

Referring to FIGS. 3 and 7, the first concave structure 111 has an accommodating cavity 1110 corresponding to the first opening 110, and the second concave structure 121 has an accommodating cavity 1210 corresponding to the second opening 120. Additionally, the housing 1 can further include a plurality of semicircular rib structures 16 that are disposed in different corners of the accommodating cavities 1110 and 1210. For example, the accommodating cavity 1110 of the first concave structure 111 can be a square cavity with four semicircular rib structures 16, and the four semicircular rib structures 16 are located at four corners of the accommodating cavity 1110. Similarly, the accommodating cavity 1210 of the second concave structure 121 can be a square cavity with four semicircular rib structures 16, and the four semicircular rib structures 16 are located at four corners of the accommodating cavity 1210.

As shown in FIG. 3, in the first concave structure 111 and the second concave structure 121, cavity walls that form the first opening 110 and the second opening 120 are thinner. Consequently, during the injection molding process, the cavity wall area is prone to poor flow of molten plastic, which causes the molten plastic to cool before completely filling the mold cavity, thereby resulting in insufficient filling in the later stages and failure to achieve full mold, leading to material shortages and damage. In the present disclosure, by arranging the semicircular rib structures 16 positioned at the four corners of the accommodating cavities 1110 and 1210, the cavity walls forming the first opening 110 and the second opening 120 can be thickened to improve the flow of the molten plastic and address the issue of insufficient filling that leads to material shortage damage after product molding.

Figure 8:
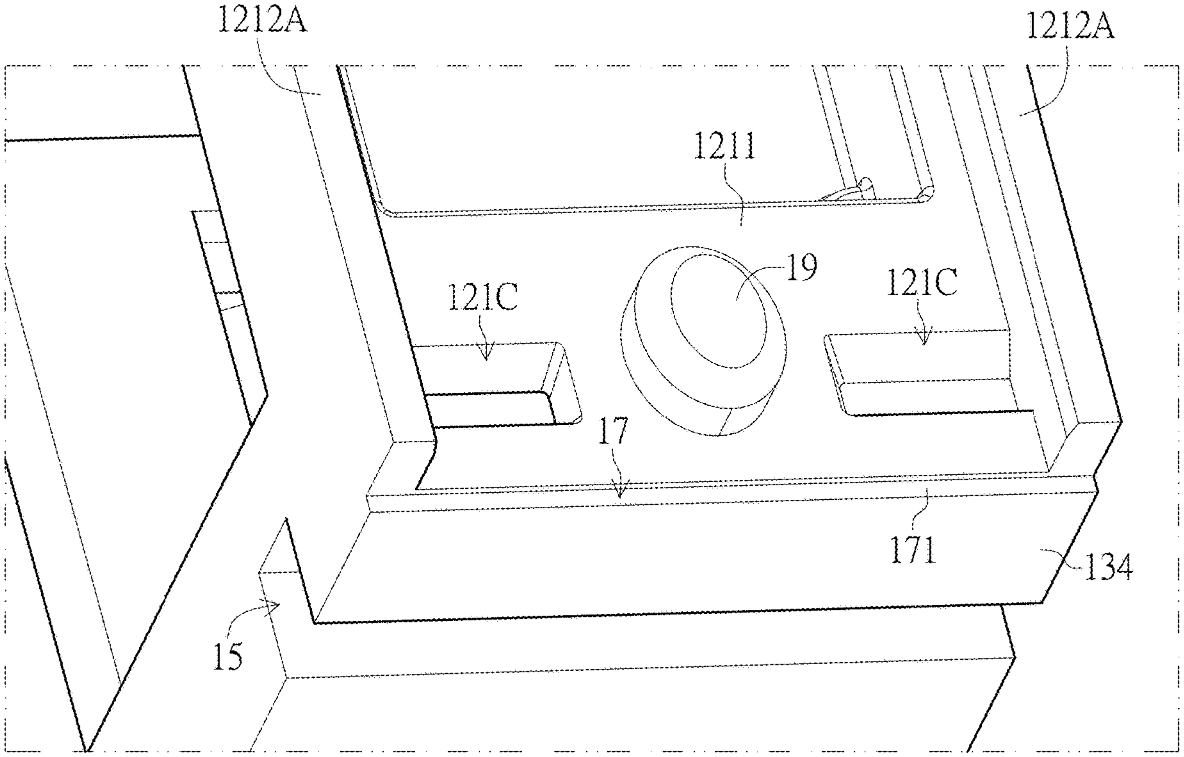
FIG. 8 is a partial schematic view of the housing according to the first embodiment of the present disclosure.

The housing 1 further two stair structures 17. For example, as shown in FIGS. 7 and 8, one of the stair structures 17 is formed between the second side wall 1211 of the second upright portion 12 and the bottom (i.e., the lower surface 134) of the base portion 13. Similarly, as shown in FIG. 3, another one of the two stair structures 17 is formed between the first side wall 1111 of the first upright portion 11 and the bottom (i.e., the lower surface 134) of the base portion 13. Each of the two stair structures 17 has a stair surface 171. There is a height difference (or step difference) between the stair surface 171 and the first side wall 1111, as well as between the stair surface 171 and the second side wall 1211, which does not exceed 20 μm. Specifically, the height difference is primarily designed to prevent burrs from being formed in the area (i.e., the area between the first side wall 1111 and the lower surface 134 of the base portion 13, as well as the area between the second side wall 1211 and the lower surface 134 of the base portion 13). During the molding process of the housing 1, if the mold matching surface is misaligned due to the difference in positioning accuracy when the male mold and the female mold are closed, uneven burrs appear on the mold matching surface. Therefore, through the stair structures 17 being formed between the first side wall 1111 and the lower surface 134 of the base portion 13, as well as between the second side wall 1211 and the lower surface 134 of the base portion 13, so that the burrs that are formed on the stair surfaces 171 do not protrude excessively from the first side wall 1111 and the second side wall 1211, thereby ensuring that the burrs do not affect the stability of the first circuit board 21 and the second circuit board 31 fitting against the first side wall 1111 and the second side wall 1211.

Figure 9:
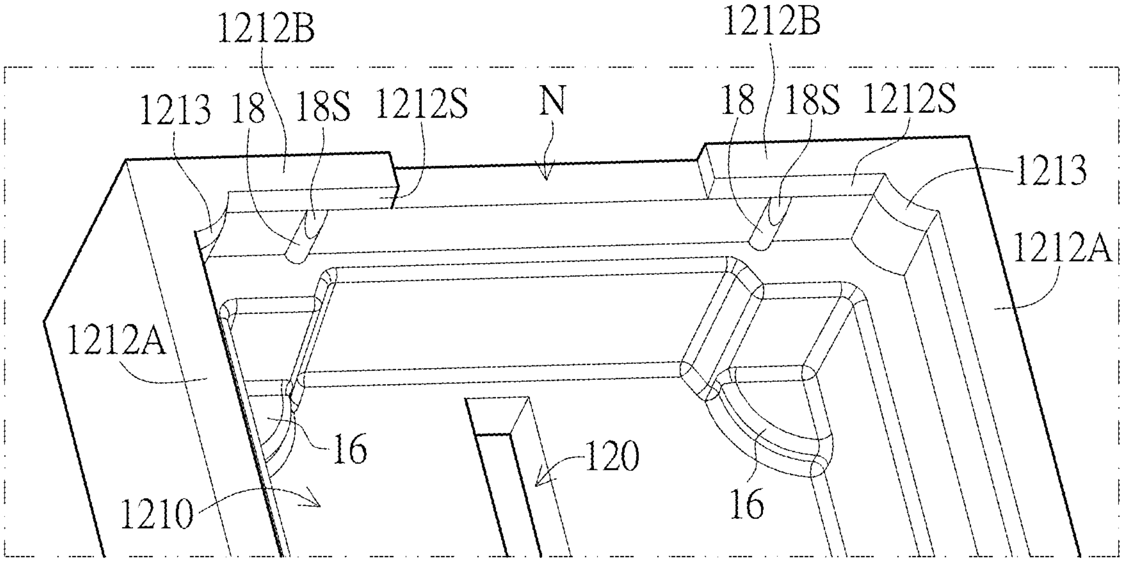
FIG. 9 is another partial schematic view of the housing according to the first embodiment of the present disclosure.

For example, each of the first upright portion 11 and the second upright portion 12 further includes two retaining ribs 18. The second upright portion 12 is taken as an example, while the first upright portion 11 has the same structure, and will not be reiterated herein). Reference is made to FIG. 9. The two retaining ribs 18 are respectively disposed on the two short portions 1212B and are located on an inner side of the second outer wall 1212, while the notch N is located between the two retaining ribs 18. Additionally, an inner edge of the second outer wall 1212 has a slope 1212S, and one end of each of the retaining ribs 18 is adjacent to the slope 1212S and forms an inclined structure 18S. By using the inclined structure 18S in conjunction with the slope 1212S on the inner edge of the second outer wall 1212, the second circuit board 31 can be smoothly inserted into the second concave structure 121 and further secured by the two retaining ribs 18 for bonding.

Reference is further made to FIG. 3. For example, the first outer wall 1112 further includes two first limiting portions 1113. One of the two first limiting portions 1113 is disposed at an intersections between one of the two long portions 1112A and one of the two short portions 1112B, and another one of the two first limiting portions 1113 is disposed at an intersections between another one of the two long portions 1112A and another one of the two short portions 1112B. Similarly, for example, as shown in FIG. 9, the second outer wall 1212 further includes two first limiting portions 1213. One of the two first limiting portions 1213 is disposed at an intersections between one of the two long portions 1212A and one of the two short portions 1212B, and another one of the two first limiting portions 1213 is disposed at an intersections between another one of the two long portions 1212A and another one of the two short portions 1212B.

Figure 10:
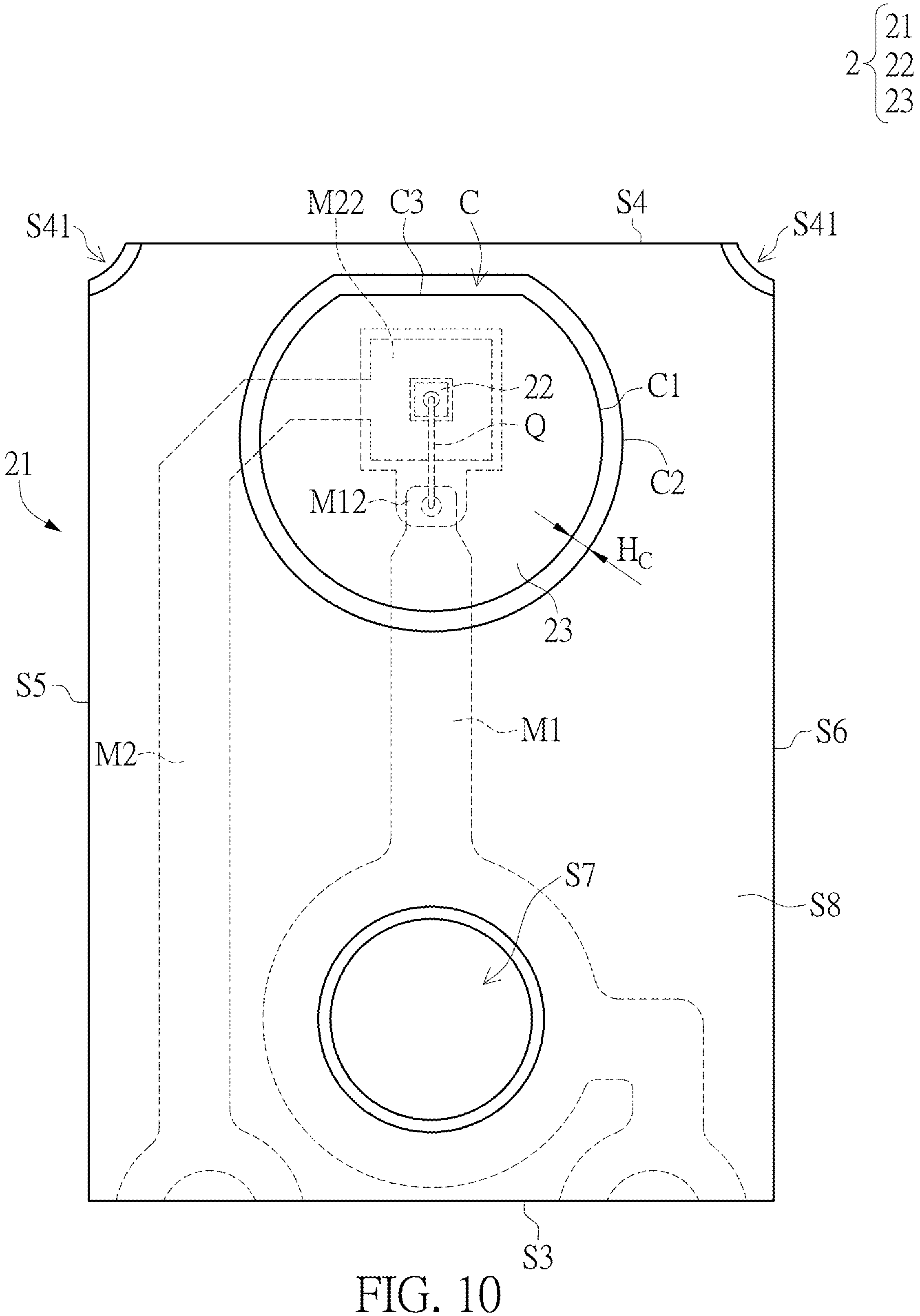
FIG. 10 is a first schematic view of a light-emitting module according to the present disclosure.

Reference is made to FIG. 10. The light-emitting module 2 includes the first circuit board 21, a light-emitting element 22, and a first light-permeable element 23. The light-emitting element 22 and the first light-permeable element 23 are disposed on the first circuit board 21, and the first light-permeable element 23 covers the light-emitting element 22. As shown in FIGS. 3 and 10, when the light-emitting module 2 is disposed in the first concave structure 111, the first circuit board 21 is embedded in the first concave structure 111, and the first light-permeable element 23 is disposed in the accommodating cavity 1110, so that the light-emitting element 22 corresponds to the first opening 110.

Figure 15:
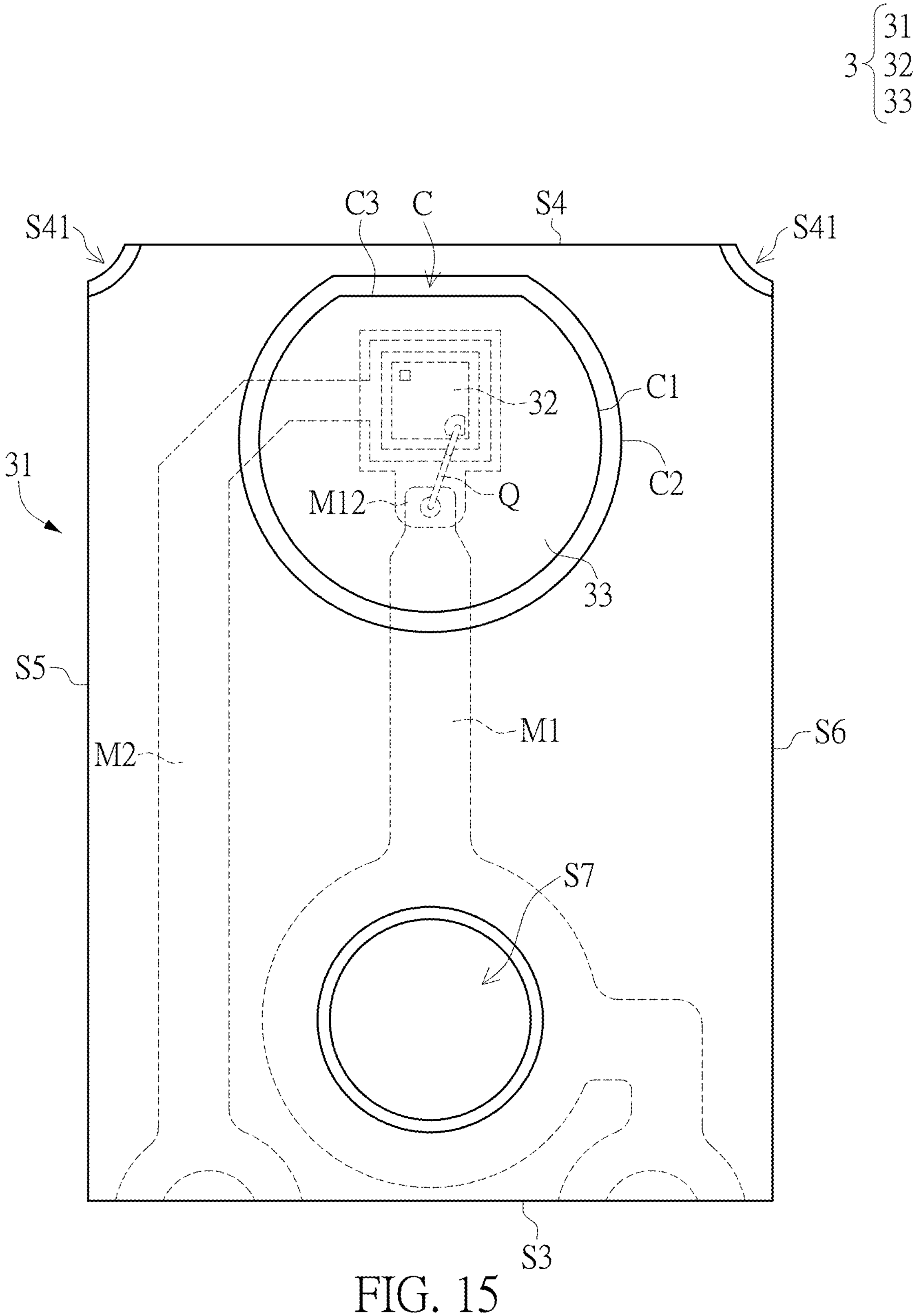
FIG. 15 is a schematic view of a light-receiving module according to the present disclosure.

Referring to FIG. 15, the light-receiving module 3 includes the second circuit board 31, a light-receiving element 32, and a second light-permeable element 33. The light-receiving element 32 and the second light-permeable element 33 are disposed on the second circuit board 31, and the second light-permeable element 33 covers the light-receiving element 32. As shown in FIGS. 2 and 15, when the light-receiving module 3 is disposed in the second concave structure 121, the second circuit board 31 is embedded in the second concave structure 121, and the second light-permeable element 33 is disposed in the accommodating cavity 1210, so that the light-receiving element 32 corresponds to the second opening 120.

As shown in FIGS. 2, 10, and 15, for example, the light-emitting element 22 can be a light-emitting diode (LED), which can emit a light beam such as infrared, ultraviolet, or visible light, preferably infrared. For example, the light-receiving element 32 can be a photodetector. The first light-permeable element 23 and the second light-permeable element 33 can be made of light-permeable resin by dispensing. An outline of the surface of each of the first light-permeable element 23 and the second light-permeable element 33 is spherical. The light beam emitted by the light-emitting element 22 penetrates the first light-permeable element 23, passes through the first opening 110 and the second opening 120 to enter the second light-permeable element 33, and is then received by the light-receiving element 32. Therefore, when an object under detection is interposed between the light-emitting element 22 and the light-receiving element 32, the light beam emitted by the light-emitting element 22 will be blocked by the object under detection, such that an amount of the light beam that is received by the light-receiving element 32 is changed, so as to detect if the object is present for detection.

Referring to FIG. 10, a surface of the first circuit board 21 forms an annular slot C. The annular slot C includes an inner annular portion C1 and an outer annular portion C2. The inner annular portion C1 and the outer annular portion C2 are separated by a gap $H_c$, and the gap $H_c$ ranges from 50 μm to 200 μm, preferably 100 μm. The annular slot C surrounds the light-emitting element 22. The first light-permeable element 23 is limited in a region that is surrounded by the annular slot C.

Figure 11:
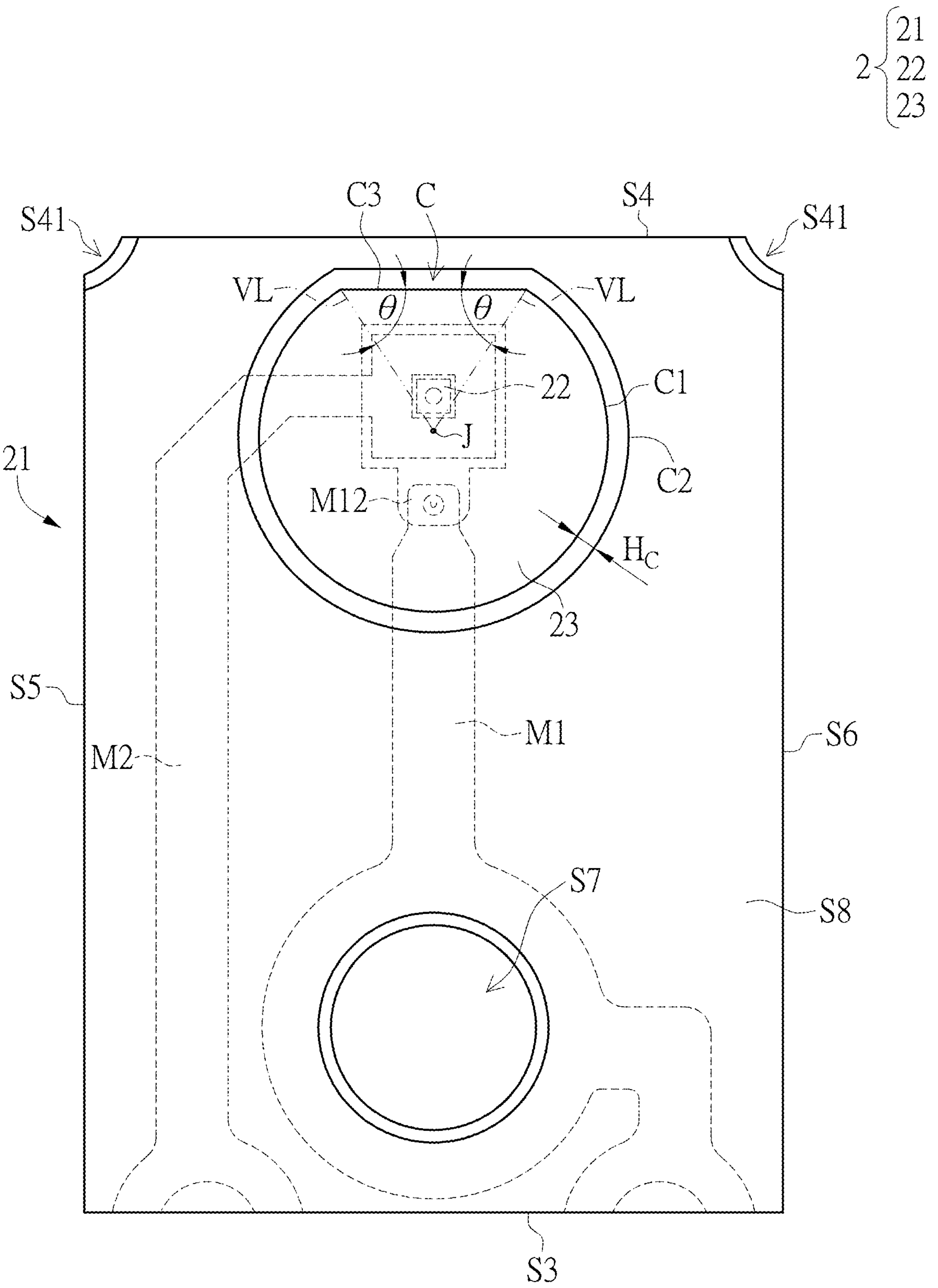
FIG. 11 is a schematic view of the light-emitting module without conductive wires according to the present disclosure.

As shown in FIGS. 2 and 10, a part of the inner annular portion C1 forms a straight line C3, and the outer annular portion C2 forms another straight line on the same side as the straight line C3. Through the design of the straight line C3, the spherical surface of the first light-permeable element 23 can form an asymmetric spherical shape. Reference is made to FIG. 11. A metal wire Q in FIG. 11 is omitted (comparing to FIG. 10) for clear illustration. In FIG. 11, two ends of the straight line C3 are connected to a center J of the inner annular portion C1 to form two connecting lines VL, and an included angle θ between the two connecting lines VL can be, for example, 60 degrees. In other words, the two connecting lines VL and the straight line C3 form an equilateral triangle. The distance from the center J of the inner annular portion C1 to each of the two ends of the straight line C3 is equal to a length of the straight line C3. Additionally, a center of the light-emitting element 22 is 0.2 mm away from the center J of the inner annular portion C1. That is, the light-emitting element 22 is offset from the center J of the inner annular portion C1 by approximately 0.2 mm. By utilizing the offset design of the light-emitting element 22 in conjunction with the asymmetric spherical shape of the first light-permeable element 23, the viewing angle of the light beam can be maintained between 5 and 100 degrees. That is, the offset range of the viewing angle is maintained at about 5 degrees, so that the luminous efficiency of the light-emitting element 22 can be improved.

Similarly, the structural configuration of the second circuit board 31 is the same as that of the first circuit board 21. As shown in FIG. 15, the light-receiving element 32 is disposed on the second circuit board 31 and is surrounded by an annular slot C on the second circuit board 31. The second light-permeable element 33 is limited in a region surrounded by the annular slot C. A specific shape of the second light-permeable element 33 can be reviewed in conjunction with FIG. 2. Through the design of the straight line C3, the spherical surface of the first light-permeable element 23 can form an asymmetric spherical shape, which has the same structural design as the first light-permeable element 23 and will not be reiterated herein. Furthermore, a center of the light-receiving element 32 is 0.2 mm away from a center of the inner annular portion C1. Since the structural design of the second circuit board 31 is the same as that of the first circuit board 21, the following explanation will primarily use the first circuit board 21 as an example.

Figure 12:
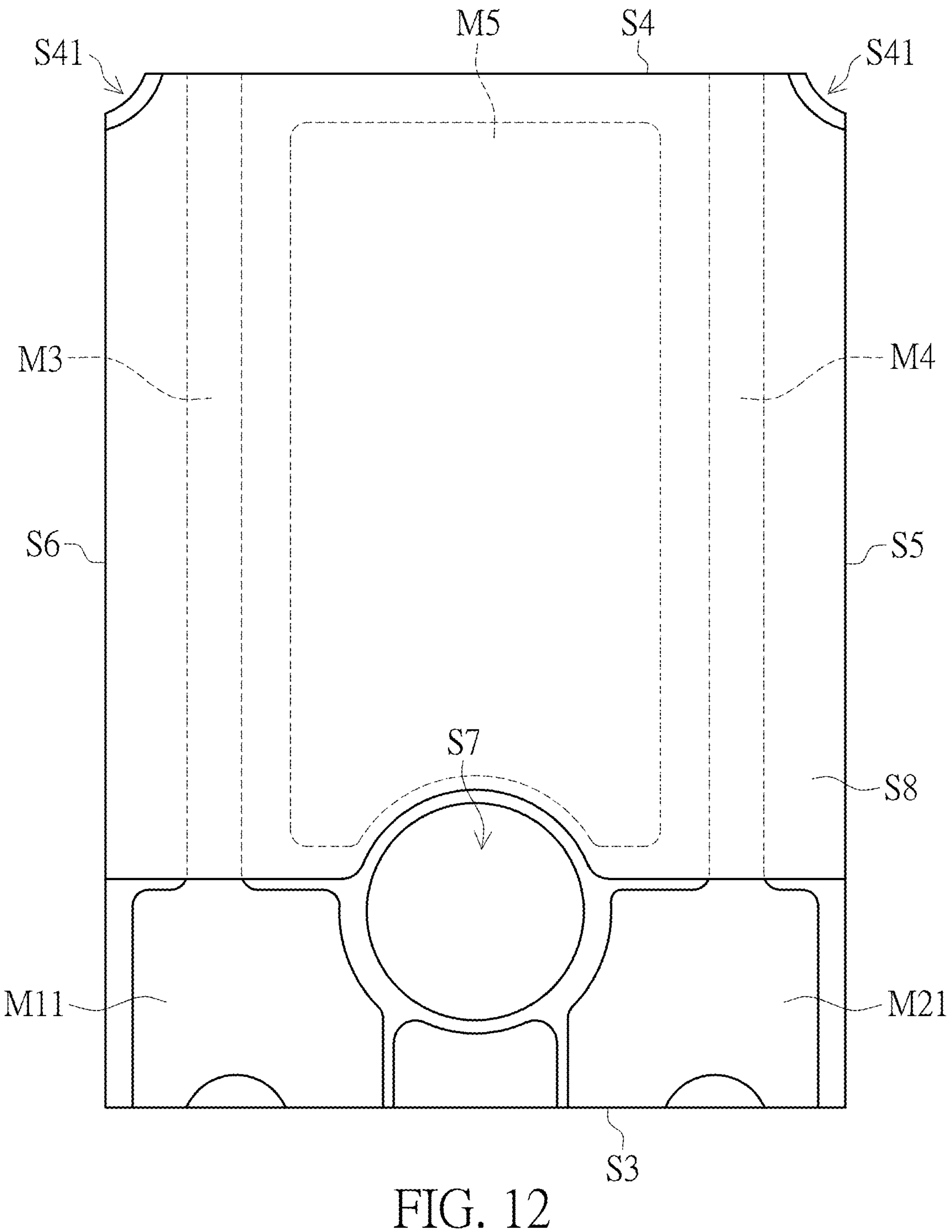
FIG. 12 is a second schematic view of the light-emitting module according to the present disclosure.
Figure 13:
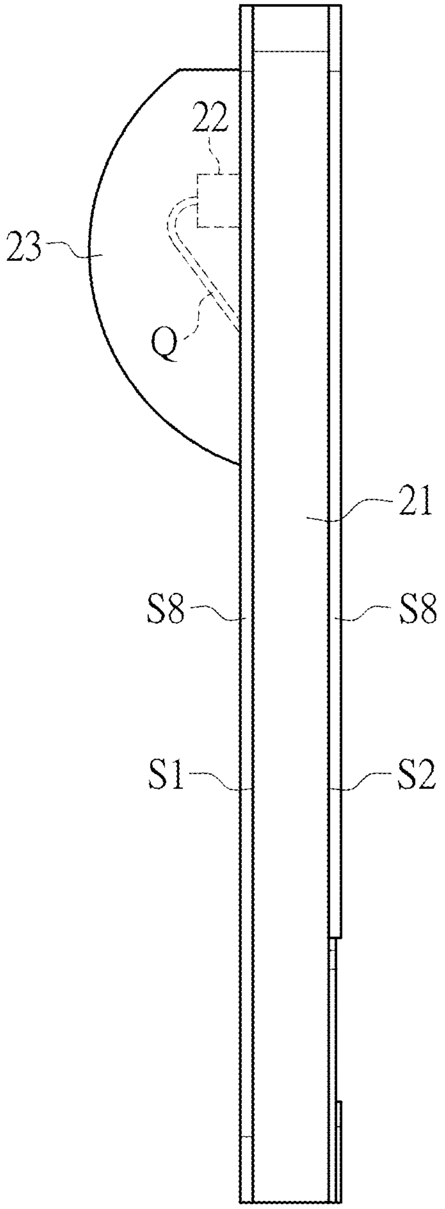
FIG. 13 is a third schematic view of the light-emitting module according to the present disclosure.

Referring to FIGS. 10, 12, and 13, the first circuit board 21 has a first surface S1, a second surface S2, a first side surface S3, a second side surface S4, a third side surface S5, and a fourth side surface S6. The first surface S1 and the second surface S2 are located on opposite sides of the first circuit board 21. The first side surface S3 is connected between the first surface S1 and the second surface S2. The second side surface S4 and the first side surface S3 are located on opposite sides of the first circuit board 21. The third side surface S5 and the fourth side surface S6 are located on opposite sides of the first circuit board 21. The second side surface S4 is connected between the third side S5 and the fourth side S6.

Each of the first surface S1 and the second surface S2 of the first circuit board 21 is coated with a solder mask layer S8, and the annular slot C is formed by the solder mask layer S8 located on the first surface S1. The annular slot C can concentrate the light-permeable resin forming the first light-permeable element 23 within the region surrounded by the annular slot C without overflowing to other regions of the first circuit board 21. Similarly, the second light-permeable element 33 on the second circuit board 31 is the same (shown in FIG. 15) as the first light-permeable element 23 on the first circuit board 21, and will not be reiterated herein.

Reference is made to FIGS. 10, 12, and 13. For example, the first circuit board 21 further includes a positioning hole S7 that passes through the first surface S1 and the second surface S2. Additionally, there are two second limiting portions S41 are provided between the second side surface S4 and the third side surface S5, as well as between the second side surface S4 and the fourth side surface S6.

Furthermore, as shown in FIG. 3, the first concave structure 111 further includes a limiting column 19, which is disposed on the first side wall 1111 and located between the two first slots 111C. The limiting column 19 can be, for example, an elliptical cylinder. The elliptical cylinder has an elliptical surface, and a long axis of the elliptical surface of the elliptical cylinder is parallel to a Z-axis. As shown in FIGS. 3 and 10, when the first circuit board 21 is embedded in the first concave structure 111, the limiting column 19 is inserted into the positioning hole S7 of the first circuit board 21, and the two second limiting portions S41 of the first circuit board 21 are engaged with the two first limiting portions 1113 of the first concave structure 111. Similarly, as shown in FIG. 2, the second concave structure 121 also includes a limiting column 19 and the first limiting portions 1213, and the second circuit board 31 also includes a positioning hole S7 and the second limiting portions S41 (shown in FIG. 15), and will not be reiterated herein.

By utilizing the design of the limiting columns and the limiting portions formed in the concave structures to position the circuit boards that are engaged in the concave structures. As shown in FIGS. 2 and 3, the first circuit board 21 and the first concave structure 111 are taken as an example. The displacement of the first circuit board 21 can be limited in the Y-axis direction through the two first limiting portions 1113. Through the structural design of the elliptical cylinder of the limiting column 19 and the long axis of the elliptical surface that is parallel to the Z-axis, the displacement of the first circuit board 21 can be limited in the Z-axis direction. Furthermore, the limiting column 19 and the two retaining ribs 18 joint form three fixed points to securely fix the circuit boards (i.e., the first circuit board 21 and the second circuit board 31) in the concave structures (i.e., the first concave structure 111 and the second concave structure 121) for bonding.

Figure 14:
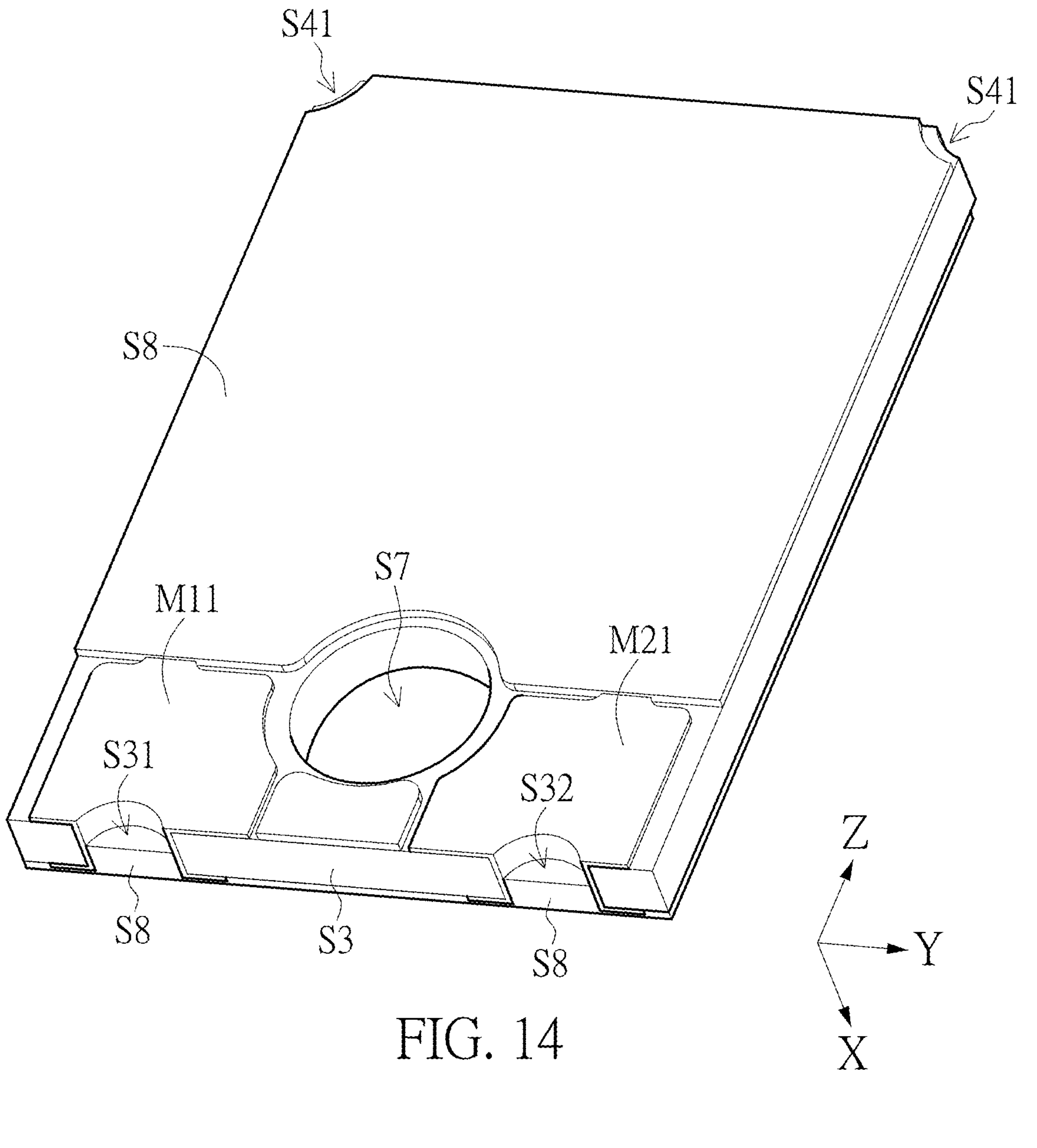
FIG. 14 is a fourth schematic view of the light-emitting module according to the present disclosure.

Referring to FIG. 10 and FIG. 14, the first circuit board 21 is continuously taken as an example for explanation. For example, the first side surface S3 of the first circuit board 21 has a first recess S31 and a second recess S32. The first circuit board 21 further includes a first metal pattern structure M1 and a second metal pattern structure M2. The first metal pattern structure M1 and the second metal pattern structure M2 are disposed on the first surface S1 of the first circuit board 21. The first metal pattern structure M1 surrounds the positioning hole S7. One end of the first metal pattern structure M1 passes the first recess S31 and further extends to the second surface S2 to form a first soldering portion M11, while another end of the first metal pattern structure M1 forms a first metal pad M12. One end of the second metal pattern structure M2 passes the second recess S32 and further extends to the second surface S2 to form a second soldering portion M21, while another end of the second metal pattern structure M2 forms a second metal pad M22.

When the photoelectric sensor of the present disclosure is soldered to an external circuit board, the bottom (i.e., the first side surface S3) of the first circuit board 21 is soldered to the external circuit board. The first recess S31 and the second recess S32 are filled with solder that extends to the first soldering portion M11 and the second soldering portion M21 on the back (i.e., the second surface S2) of the first circuit board 21, thereby increasing the soldering area. In a preferred embodiment, a part where the solder extends to the first soldering portion M11 occupies approximately half of the area of the first soldering portion M11, and a part where the solder extends to the second soldering portion M21 occupies approximately half of the area of the second soldering portion M21. Specifically, since the structural design of the grooves 15 and the reinforcing ribs 14 improves the inward shrinkage deformation of the housing, the solder distributed over the first soldering portion M11 and the second soldering portion M21 occupies about half of their respective areas.

Therefore, an electrode of the light-emitting element 22 is electrically connected to the first metal pad M12 through the metal wire Q, while another electrode of the light-emitting element 22 is directly and electrically connected to the second metal pad M22. Similarly, the arrangement of the light-receiving element 32 and the second circuit board 31 is the same as that of the light-emitting element 22 and the first circuit board 21 (shown in FIGS. 12 and 15), and will not be reiterated herein. Since the structures of the first circuit board 21 is the same as that of the second circuit board 31, the back of the first circuit board 21 shown in FIG. 12 is also suitable for the second circuit board 31.

As shown in FIG. 12, each of the first circuit board 21 and the second circuit board 31 further include a third metal pattern structure M3, a fourth metal pattern structure M4, and a fifth metal pattern structure M5. The third metal pattern structure M3 and the fourth metal pattern structure M4 are disposed on the second surface S2. The third metal pattern structure M3 is connected to the first soldering portion M11, the fourth metal pattern structure M4 is connected to the second soldering portion M21. The fifth metal pattern structure M5 is disposed on the second surface S2 and is located between the third metal pattern structure M3 and the fourth metal pattern structure M4. The positioning hole S7 is located between the fifth metal pattern structure M5 and the first recess S31 and the second recess S32. For example, the first to fifth metal pattern structures M1~M5 are made of copper. By configuring the fifth metal pattern structure M5 on the second surface S2 in conjunction with the third metal pattern structure M3 and the fourth metal pattern structure M4, and matching them with the first metal pattern structure M1 and the second metal pattern structure M2 located on the first surface S1, uneven distribution of copper material on both sides of the circuit board is avoided, thus preventing stress imbalance during thermal expansion that could lead to circuit board warping.

As shown in FIG. 14, on the first circuit board 21 and the second circuit board 31, the solder mask layer S8 coated on the first surface S1 can further extend into the first recess S31 and the second recess S32, filling a part of a space in the first recess S31 and the second recess S32. For example, each of the first recess S31 and the second recess S32 has a depth along the X-axis direction, and a part of the solder mask layer S8 extending to each of the first recess S31 and the second recess S32 has a thickness along the X-axis direction. Preferably, the thickness is about half the depth. In other words, the solder mask layer S8 fills approximately half the depth of the first recess S31 and also half the depth of the second recess S32, thereby forming a blind hole structure for each of the first recess S31 and the second recess S32.

Reference is made to FIG. 1 and FIG. 2, and in conjunction with FIG. 14. The second circuit board 31 is taken as an example for explanation. When the second circuit board 31 is bonded to the second recessed structure 121 through the adhesive member 4, the solder mask layer S8 is located between the blind hole structures (i.e., the first recess S31 and the second recess S32) and the adhesive member 4. Therefore, the solder mask layer S8 can prevent the adhesive member 4 from overflowing from the first recess S31 and the second recess S32 to the first soldering portion M11 and the second soldering portion M21.

Second Embodiment

Figure 16:
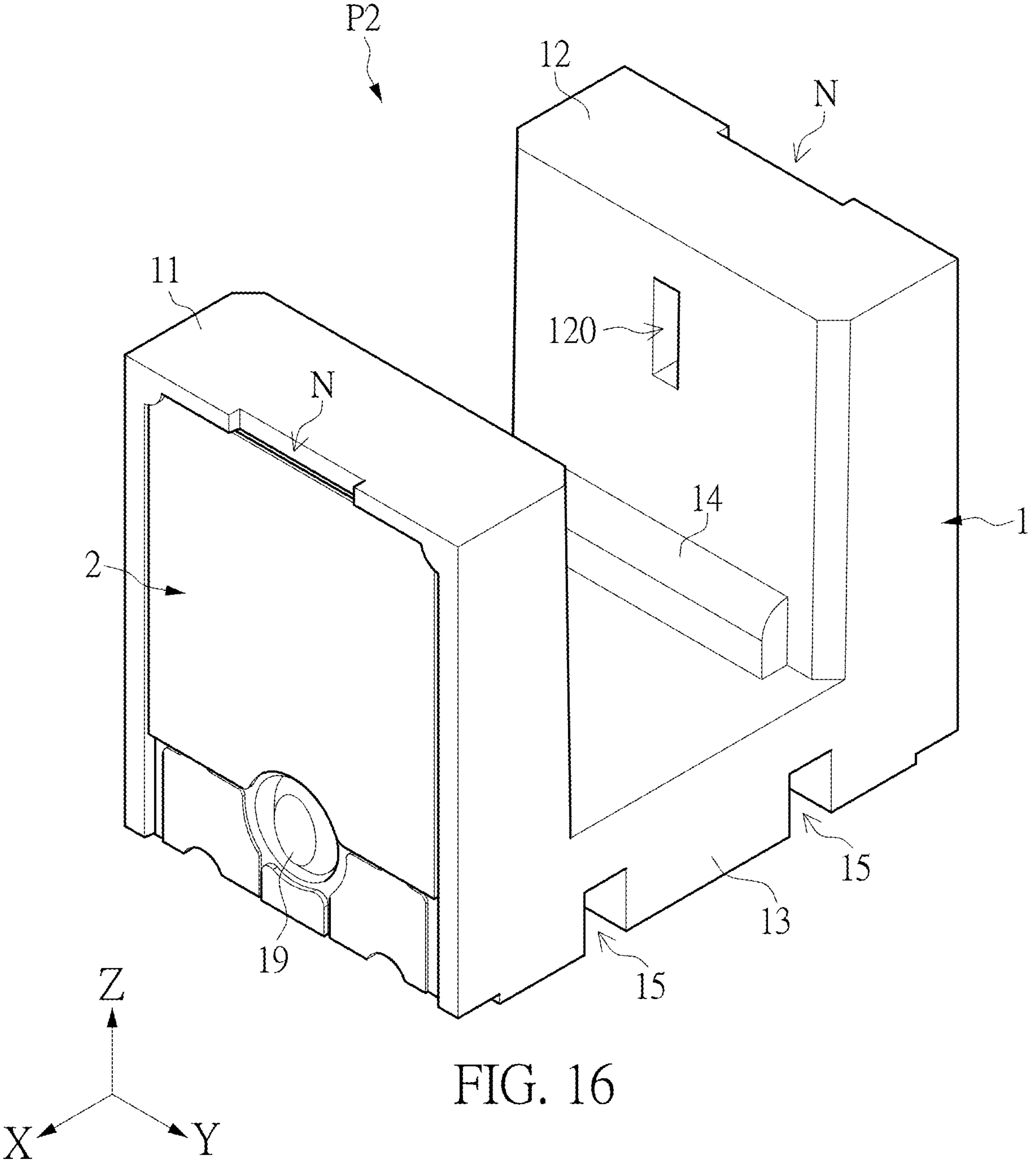
FIG. 16 is a schematic perspective view of a photoelectric sensor according to a second embodiment of the present disclosure.
Figure 17:
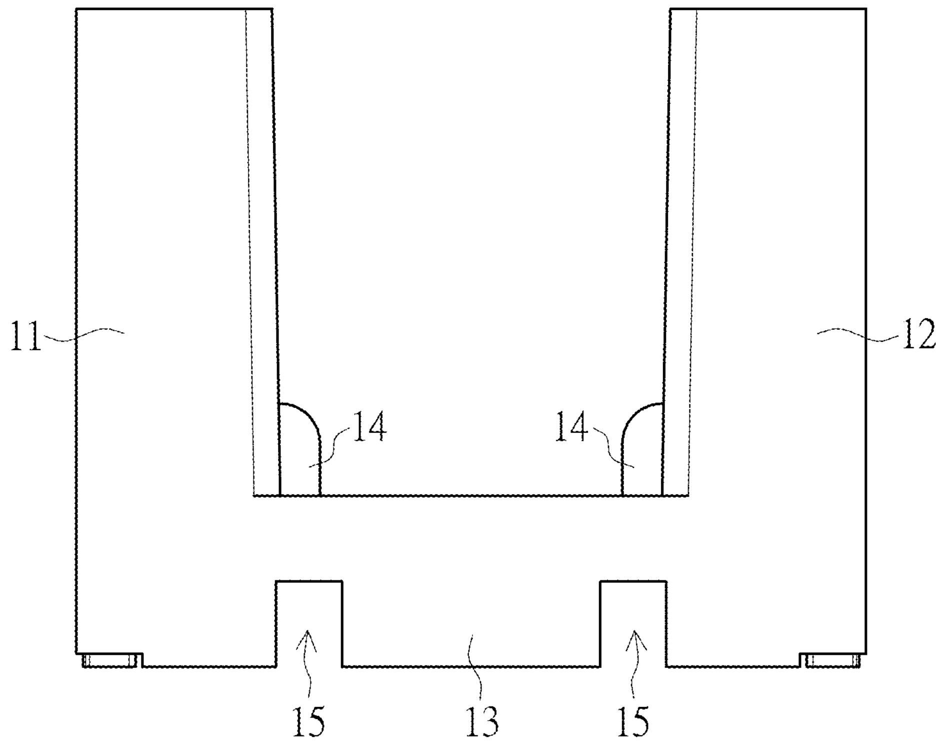
FIG. 17 is a schematic side view of the photoelectric sensor according to the second embodiment of the present disclosure.

Reference is made to FIG. 16 and FIG. 17. A second embodiment of the present disclosure provides a photoelectric sensor P2, which includes a housing 1, a light-emitting module 2, a light-receiving module 3, and two adhesive members 4. The photoelectric sensor P2 in the second embodiment has a structure similar to that of the photoelectric sensor P1 in the first embodiment, and the similarities therebetween will not be reiterated herein. The main difference in the structure of the photoelectric sensor P2 in the second embodiment compared to the photoelectric sensor P1 in the first embodiment lies in the shape of the reinforcing rib 14 of the housing 1.

Specifically, in the second embodiment, the surface of the reinforcing rib 14 can be, for example, a convex curved surface, which is different from the flat surface of the reinforcing rib 14 in the first embodiment.

Third Embodiment

Figure 18:
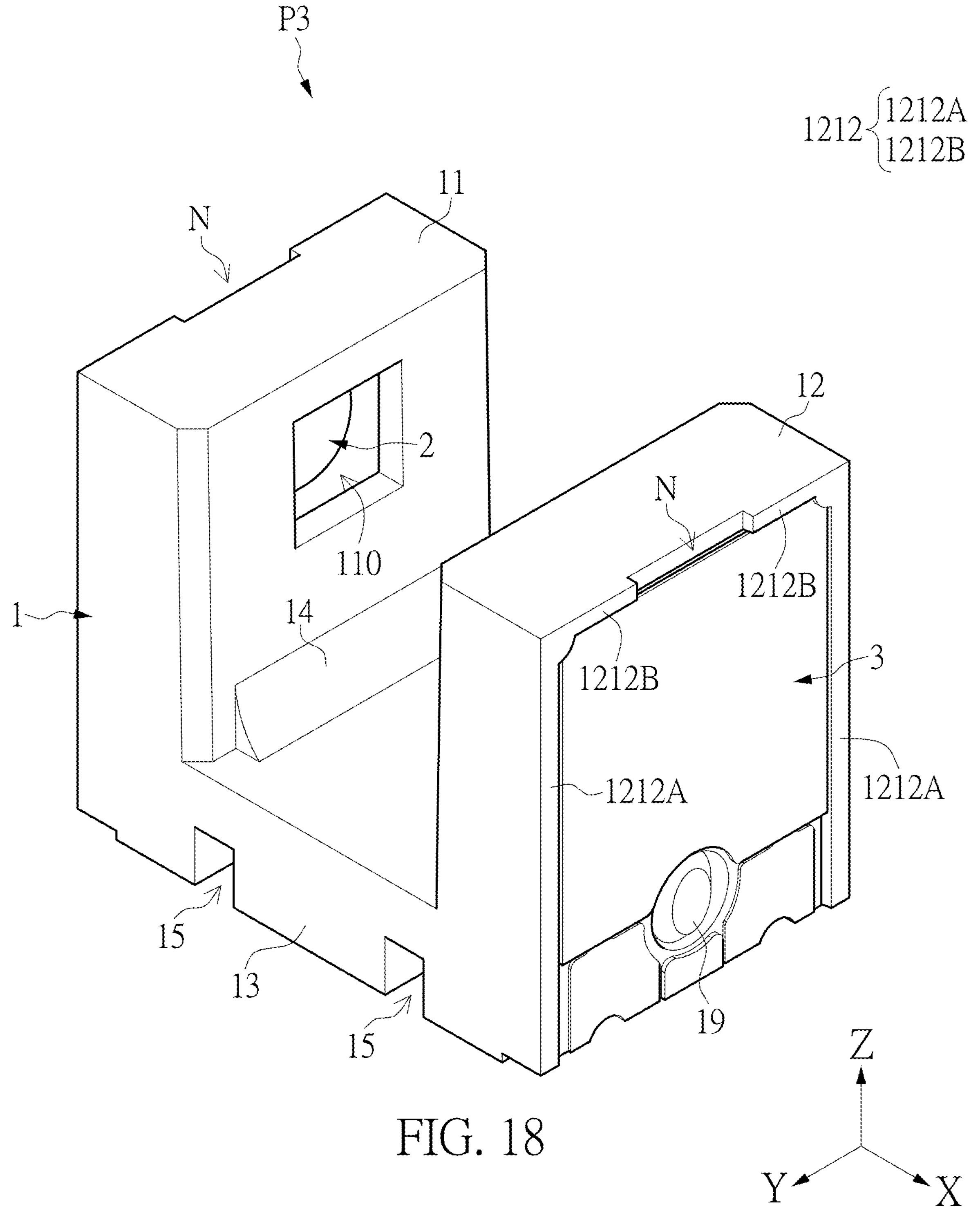
FIG. 18 is a schematic perspective view of a photoelectric sensor according to a third embodiment of the present disclosure.
Figure 19:
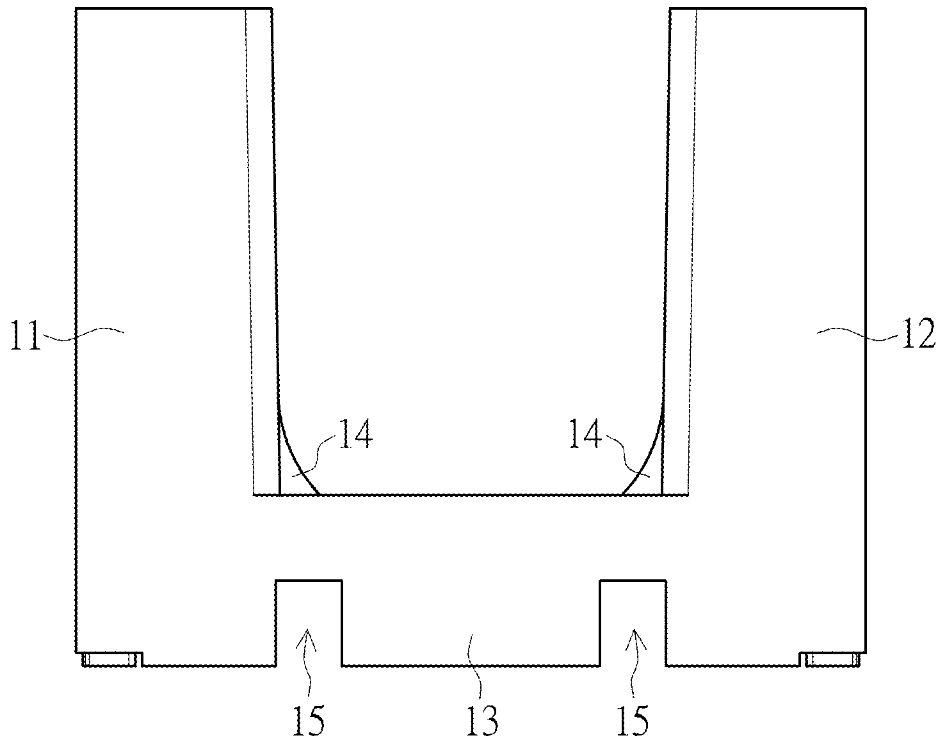
FIG. 19 is a schematic side view of the photoelectric sensor according to the third embodiment of the present disclosure.

Reference is made to FIG. 18 and FIG. 19. A third embodiment of the present disclosure provides a photoelectric sensor P3, which includes a housing 1, a light-emitting module 2, a light-receiving module 3, and two adhesive members 4. The photoelectric sensor P3 in the third embodiment has a structure similar to that of the photoelectric sensor P1 in the first embodiment, and the similarities therebetween will not be reiterated herein. The main difference in the structure of the photoelectric sensor P3 in the third embodiment compared to the photoelectric sensor P1 in the first embodiment lies in the shape of the reinforcing rib 14 of the housing 1.

Specifically, in the third embodiment, the surface of the reinforcing rib 14 can be, for example, a concave curved surface, which is different from the flat surface of the reinforcing rib 14 in the first embodiment.

Fourth Embodiment

Figure 20:
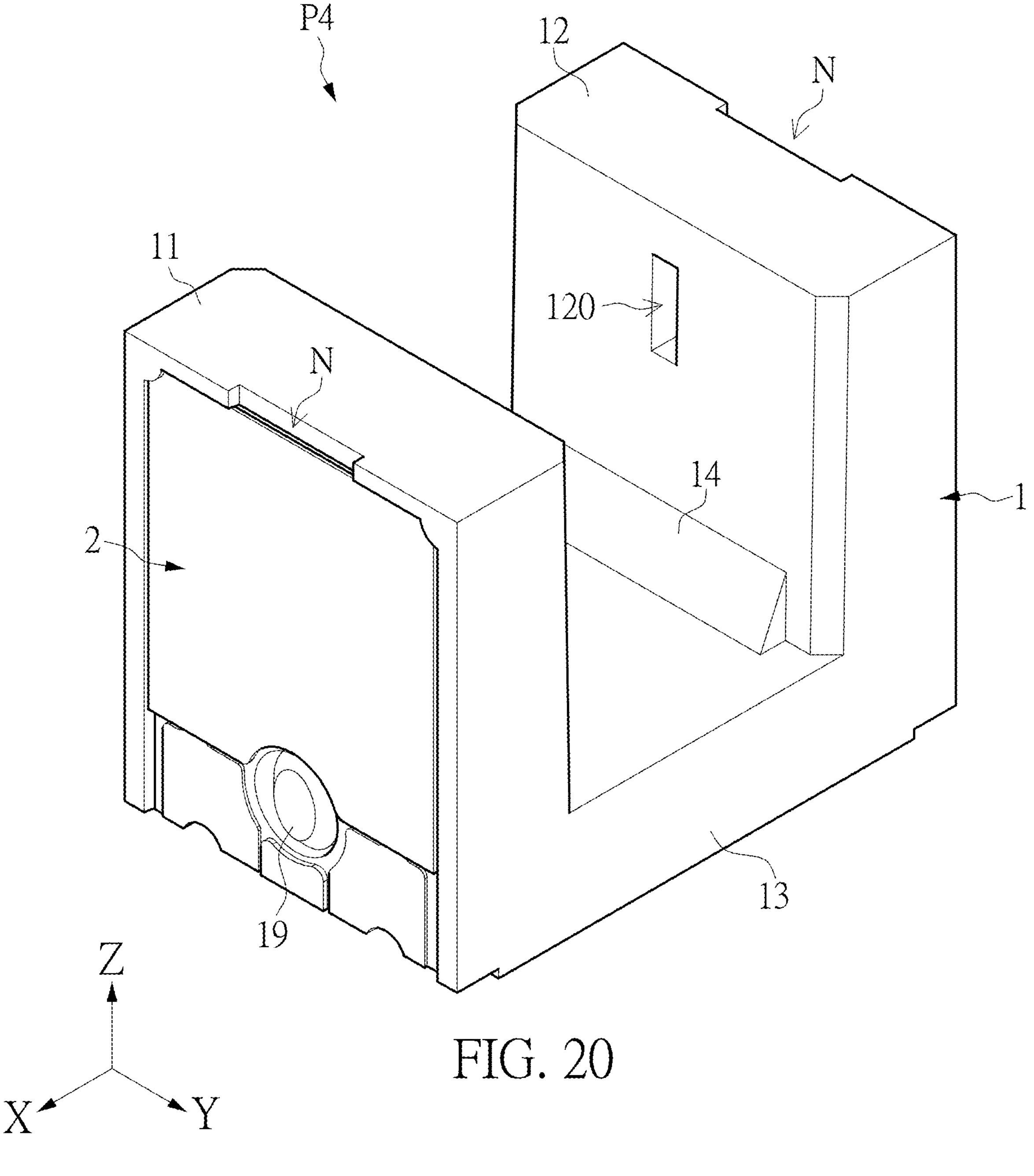
FIG. 20 is a first schematic perspective view of a photoelectric sensor according to a fourth embodiment of the present disclosure.
Figure 21:
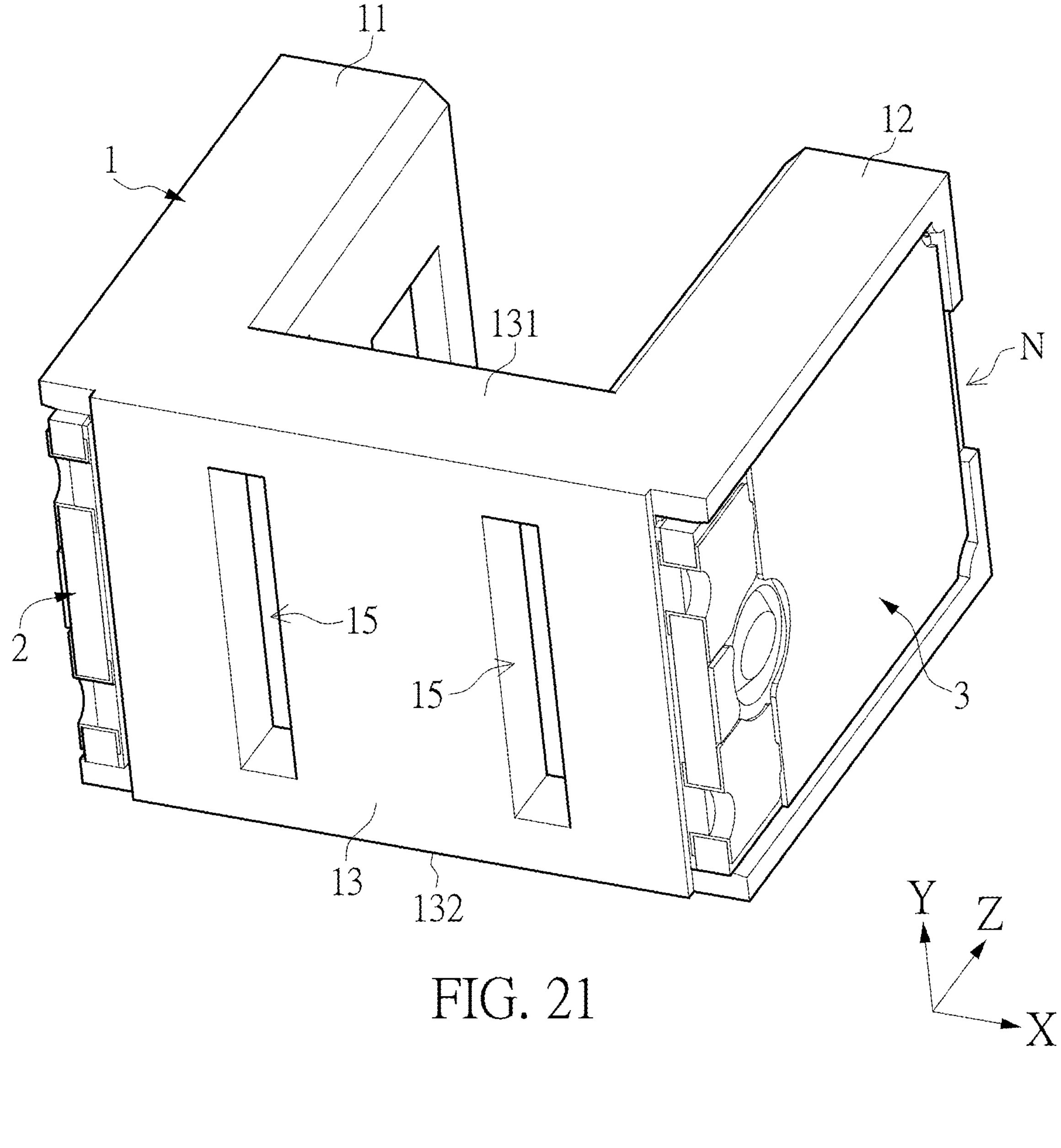
FIG. 21 is a second schematic perspective view of the photoelectric sensor according to the fourth embodiment of the present disclosure.

Reference is made to FIG. 20 and FIG. 21. A fourth embodiment of the present disclosure provides a photoelectric sensor P4, which includes a housing 1, a light-emitting module 2, a light-receiving module 3, and two adhesive members 4. The photoelectric sensor P4 in the fourth embodiment has a structure similar to that of the photoelectric sensor P1 in the first embodiment, and the similarities therebetween will not be reiterated herein. The main difference in the structure of the photoelectric sensor P4 in the fourth embodiment compared to the photoelectric sensor P1 in the first embodiment lies in the size of the groove 15 of the housing 1.

Comparing FIG. 21 of the fourth embodiment with FIG. 5 of the first embodiment, the two grooves 15 of the fourth embodiment does not penetrate the two side surfaces 131 and 132 of the base portion 13. That is, the size of the grooves 15 of the fourth embodiment is smaller than that of the grooves 15 of the first embodiment.

Additionally, it should be noted that the descriptions of the reinforcing rib 14 and the groove 15 in the first to fourth embodiments are merely examples and are not intended to limit the scope of the present disclosure. For instance, the grooves 15 that do not penetrate the two side surfaces 131 and 132 of the base portion 13 in the fourth embodiment can be applied to the housing 1 of the first to third embodiments Alternatively, the reinforcing rib 14 with the convex curved profile in the second embodiment, or the reinforcing rib 14 with the concave curved profile in the third embodiment can be applied to the housing 1 of the fourth embodiment.

Beneficial Effects of the Embodiments

In the photoelectric sensor provided by the present disclosure, by reducing the difference between the first distance L1 (existing between the tops of the two outer walls) and the second distance L2 (existing between the bottoms of the two outer walls), the difference between the second distance L2 and the first distance L1 is less than 28% of the second distance L2, so as to address the issue of the housing 1 tilting inward due to uneven shrinkage of the plastic material during the injection molding process.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A photoelectric sensor, comprising:

a housing including a first upright portion, a second upright portion, and a base portion, wherein the first upright portion and the second upright portion are connected to the base portion, the first upright portion has a first concave structure and a first opening, the first concave structure includes a first side wall and a first outer wall that surrounds the first side wall, and the second upright portion has a second concave structure and a second opening, the second concave structure includes a second side wall and a second outer wall that surrounds the second side wall;

a light-emitting module including a first circuit board and a light-emitting element, wherein the light-emitting module is embedded in the first concave structure, and the light-emitting element corresponds to the first opening;

a light-receiving module including a second circuit board and a light-receiving element, wherein the light-receiving module is embedded in the second concave structure, and the light-receiving element corresponds to the second opening; and two adhesive members being respectively provided on side walls of the first concave structure and the second concave structure, so as to respectively bond the light-emitting module into the first concave structure and the light-receiving module into the second concave structure;

wherein a top of the first outer wall and a top of the second outer wall are separated by a first distance, a bottom of the first outer wall and a bottom of the second outer wall are separated by a second distance, and a difference between the second distance and the first distance is less than 28% of the second distance.

2. The photoelectric sensor according to claim 1, wherein the housing further includes a reinforcing rib.

3. The photoelectric sensor according to claim 2, wherein there is a boundary line between the first upright portion and the base portion, the first upright portion has a width along an extension direction of the boundary line, the reinforcing rib has a length along the extension direction of the boundary line, and the length is at least ⅔ of the width.

4. The photoelectric sensor according to claim 2, wherein a surface of the reinforcing rib is a flat surface, an outer convex curved surface or an inner concave curved surface.

5. The photoelectric sensor according to claim 1, wherein the housing further includes at least one groove that is formed on a bottom of the base portion.

6. The photoelectric sensor according to claim 5, wherein the base portion has two surfaces that are opposite to each other, and the at least one groove penetrates the two surfaces.

7. The photoelectric sensor according to claim 5, wherein the base portion has a height, the at least one groove has a depth and a width, and the depth is 0.3 to 0.6 times the height.

8. The photoelectric sensor according to claim 7, wherein the width is 1.2 to 1.7 times the height.

9. The photoelectric sensor according to claim 1, wherein the housing further two stair structures, one of the two stair structures is formed between the first side wall of the first upright portion and a bottom of the base portion, and another one of the stair structures is formed between the second side wall of the second upright portion and the bottom of the base portion.

10. The photoelectric sensor according to claim 9, wherein each of the two stair structures has a stair surface, there is a height difference between the stair surface and the second side wall, and the height difference is less than or equal to 20 μm.

11. The photoelectric sensor according to claim 1, wherein a surface of the first circuit board and a surface of the second circuit board each form an annular slot, the annular slot includes an inner annular portion and an outer annular portion, and a part of the inner annular portion forms a straight line.

12. The photoelectric sensor according to claim 11, wherein two ends of the straight line are connected to a center of the inner annular portion to form two connecting lines, and an included angle between the two connecting lines is 60 degrees.

13. The photoelectric sensor according to claim 12, wherein the inner annular portion and the outer annular portion are separated by a gap, and the gap ranges from 50 μm to 200 μm.

14. The photoelectric sensor according to claim 11, wherein each of the light-emitting module and the light-receiving module includes a light-permeable element, the light-permeable element is limited in a region that is surrounded by the annular slot, and the light-permeable element forms an asymmetric spherical surface.

* * * * *